US005553242A

United States Patent [19]
Russell et al.

[11] Patent Number: 5,553,242
[45] Date of Patent: Sep. 3, 1996

[54] CLIENT/SERVER CONNECTION SHARING

[75] Inventors: Edward A. Russell, Acton; Raymond Ting-Foo Tang, Chelmsford, both of Mass.

[73] Assignee: Wang Laboratories, Inc., Billerica, Mass.

[21] Appl. No.: 143,162

[22] Filed: Nov. 3, 1993

[51] Int. Cl.$^6$ .................................................. G06F 13/00
[52] U.S. Cl. ................. 395/200.12; 364/284; 364/284.4; 364/229; 364/DIG. 1
[58] Field of Search .............................. 395/200, 200.12, 395/200.15

[56] References Cited

U.S. PATENT DOCUMENTS

| | | | |
|---|---|---|---|
| 4,586,134 | 4/1986 | Norstedt | 395/200 |
| 4,791,566 | 12/1988 | Sudama | 395/325 |
| 5,043,881 | 8/1991 | Hamazaki | 395/700 |
| 5,392,426 | 2/1995 | Urbanski | 395/650 |
| 5,404,515 | 4/1995 | Chasse | 395/650 |
| 5,406,643 | 4/1995 | Burke | 395/200 |

Primary Examiner—Eric Coleman
Attorney, Agent, or Firm—Ronald J. Paglierani

[57] ABSTRACT

A connection mechanism for providing connections between a client and a server including a connection control block for each connection, at least one client control block, and at least one session control block. Each connection control block identifies a connection and each client control block a client. Each session control block corresponds to a client control block establishes a session between a client and a connection and identifies the session, tile connection, and the server. Each session is established solely through a corresponding session control block and each operation is identified by the corresponding session identification. The connection mechanism includes a stack mechanism for storing at least one operation stack. Each operation stack corresponds to an operation to be executed through the corresponding connection and includes the session identifier and at least one operation request that is to be executed to execute the operation. An operation execution control generates a sequence of remote procedure call requests for each operation call and stores the sequence in a stack. Connection configurations may be specified. The system also includes a server and an authorization mechanism.

18 Claims, 9 Drawing Sheets

CLIENT/SERVER CONNECTION SHARING

CROSS REFERENCE TO RELATED APPLICATIONS

This patent application is related to: U.S. application Ser. No. 08/143,163, filed Nov. 3, 1993, now U.S. Pat. No. 5,455,953.

FIELD OF THE INVENTION

The present invention relates to a method and apparatus for establishing and executing remote procedure calls between clients and servers in a data processing system and, more particularly, to client connection methods and apparatus for sharing communications connections between clients and to server method and apparatus for pooling of server worker processes

BACKGROUND OF THE INVENTION

Data processing systems are frequently comprised of a plurality of client platforms, such as personal workstations or personal computers, connected through networks to one or more server platforms which provide data related services to the application programs executing on the client platforms. The data related services may include data storage and retrieval, data protection, and electronic mail services and such services may be provided to the users from both local servers and from remote servers which are networked to a user's local server.

A number of problems arise from such system configurations, however, one being that the client and server platforms are frequently based upon different operating system. For example, the client platforms may use Microsoft Windows and application programs designed to use Microsoft Windows while the server platforms may be based upon the UNIX operating system. As such, the connection and communications between the client platforms and the server platforms must be of a nature to be compatible with both types of operating systems and associated application and services programs.

Other problems arise from the inherent limitations of the connection and communications facilities associated with the client applications and, as a separable problem, with the inherent limitations of the server programs, such as the data storage and retrieval programs executing in the server platforms. These problems severely limit the capabilities of the client platforms and server platforms to communicate and to execute data storage and retrieval operations.

Referring first to the client platforms, client platforms are frequently limited in the number of network connections that they can support while there is traditionally one network connection for each client application, even if the connections are to the same server task. This in turn rapidly uses up the available client connections that can be supported by the client platform and results and a significantly slower startup time for each application when it attempts to connect to a server as a given client application may have to wait until a connection is established.

In addition, certain applications, such as those using Microsoft Windows, are pseudo multitasking rather than true multitasking, so that only the application currently having the operating system context can send and receive messages, and are non-preemptive, so that the current application will complete all message operations before passing the context to another application, so that only one application may make use of the connections at a time. Still further, such applications may be synchronous in that they will send a message or a request for an operation and then will wait until a response is received before executing a next operation. Therefore, not only are the available connections rapidly used up, but a given application may significantly delay other applications access to the available connections by forcing the other applications to wait until the application having a connection completes all of its operations.

One solution of the prior art to this problem has been to provide a connection sharing architecture, usually based upon a semaphore mechanism used in common by the applications to indicate when a connection is free for use by another application. This approach, however, not only does not solve all of the problems of the prior art as described above, but places a further burden on the application programs in that each application program must know of the connection sharing mechanism and must operate with the mechanism. This, for example, requires each application to deal with semaphoring and to hold, or queue, requests until a connection is free.

Referring now to the server platforms, server platforms usually provide a server task which operates alone to service requests one at a time. This in turn requires that the server task queue or otherwise hold pending requests until the server task has completely finished with each prior request.

One solution of the prior art has been to start a new server task or process for each new connection to the server wherein each process handles requests only from it own connection. This approach, however, substantially increases connection startup times because a new server process must be started for each new connection. In addition, this approach uses server resources inefficiently because a server process is idle until a request appears on its connection and, because an individual connection in a client/server model typically does not have frequent activity, the associated server process will be idle most of the time.

Another solution of the prior art has been for the server to include a dispatcher task which performs preliminary operations upon each incoming request and then passes the parameters of the request through an interprocess communication facility to a worker task to process. This approach is limited, however, in that the number of operations that the dispatcher must perform for each request limits the number of requests that the dispatcher can process in a given time. That is, when the rate at which requests are submitted to the server exceeds the rate at which the dispatcher can process the requests, the delay time in responding to a given request will increase to the point where the time of the server is unacceptable. As such, the rate at which requests are submitted to the dispatcher must be limited, for example, by limiting the number of connections supported by the dispatcher or by limiting the rate at which requests may be submitted through the connections. In addition, the dispatcher is not available to detect new requests while processing a current request, thereby requiring a queue mechanism to hold new requests for the dispatcher. These problems are compounded in that the request parameters frequently include addresses, thereby requiring the dispatcher task to perform address resolution operations and further slowing the processing of requests by the server.

Finally, yet other problems in systems of the prior art arise from providing system security, usually by checking the access authorizations of user to various system resources, such as databases and electronic mail services. For example, one well known and often used authorization mechanism of the prior art involves an authentication server and a directory server wherein the directory server stores the authorization rights of the clients to various system resources and a set of individual passwords for the clients and for the system resources. The client makes a request to the authentication server for an identification packet which identifies the client and the authentication server provides a corresponding identification packet containing an identification of the client and this identification packet is encrypted using the password of the server as the encryption key. The client then sends the identification packet to the server, which decodes the identification packet with its password to obtain the identification of the client and uses this client identification to access the directory server to obtain the authorization rights of the client. This approach, however, places substantial burdens on both the directory server and the server which has been accessed, due to the number of directory access operations. In addition, this approach presents serious potential security problems in that all servers must have access to the directory server and must therefore be trusted, so that a false server could penetrate system security.

SUMMARY OF THE INVENTION

The present invention is directed to a method and apparatus for use in a data processing system for providing connections between a client and a server wherein the system includes a least one server, a plurality of clients for generating operations calls, each operation call specifying an operation to be performed between a client and a server, and at least one connection for providing a communication path between a client and a server.

The present invention is directed to a connection mechanism including a connection control block for each connection, at least one client control block, and at least one session control block. Each connection control block includes an identification of a corresponding connection and each client control block includes an identification of a corresponding client and an identification of a corresponding session control block. Each session control block corresponds to a client control block and establishes a session between a client identified in the corresponding client control block and a connection to a server for executing an operation between the client and the server through the connection. Each session control block includes an identification of the session, an identification of the connection, and an identification of the server.

A connection manager is responsive to the connections for providing the connection control blocks and to the operation calls for providing the client control blocks and session control blocks, wherein each session between a client and a connection to a server is established solely through a corresponding session control block and wherein each operation is identified by the corresponding session identification to relate the operation to a client, a connection and a session.

In a further aspect of the connection mechanism, the connection mechanism includes a stack mechanism associated with each connection control block for storing at least one operation stack. Each operation stack corresponds to an operation to be executed through the corresponding connection and includes the session identifier of the session through which the operation is being executed and at least one operation request that is to be executed to execute the operation. Each connection control block further includes an identifier of the stack of the operation currently being executed through the corresponding connection and the state of execution of the operation currently being executed through the corresponding connection.

The connection mechanism further includes an operation execution control responsive to each operation call for generating a corresponding sequence of remote procedure call requests, storing the corresponding sequence of remote procedure call requests in a corresponding stack as the at least one operation request to be executed to execute the operation, and, for each connection, executing the sequence of remote procedure call requests of the operation currently being executed through the corresponding connection. Each remote procedure call request of the operation currently being executed through the corresponding connection is identified by the corresponding session identifier.

The connection mechanism also includes a connection configuration control for specifying a configuration of connections to be established between the clients and the servers through the session wherein the connection manager is responsive to the connection configuration control for providing client control blocks, connection control blocks and session control blocks according to a connection configuration specified by the connection configuration control. The connection configurations include a shared connection configuration, a single connection configuration and a pooled connection configuration.

In yet another aspect of the present invention, the server includes a dispatcher, a plurality of worker tasks, and a plurality of dispatcher shared memory areas wherein each dispatcher shared memory area corresponds to a worker task. The dispatcher is responsive to an operation call from the connection mechanism for selecting a worker task to execute the operation call, receiving the operation call directly into the dispatcher shared memory space of the worker task, and indicating to the worker task that an operation call has been assigned to the worker task.

The worker task is responsive to the indication of an operation call for receiving the operation call from the dispatcher shared memory space of the worker task, executing the operation call, placing the results of the operation call into the dispatcher shared memory space of the worker task, and indicating to the dispatcher that the operation call is completed.

The dispatcher is then responsive to the indication that the operation call is completed for providing the results of the operation request directly from the dispatcher shared memory space of the worker task to the connection mechanism.

As described above, in the present implementation of the connection mechanism each operation call provided from a client is provided from the connection mechanism as a sequence or one or more remote procedure call requests and each remote procedure call request includes an associated buffer containing the parameters of the remote procedure call request. The server mechanism further includes a plurality of worker control blocks wherein each worker control block corresponds to a worker task and includes a semaphore which is set by the dispatcher to indicate that an remote procedure call request has been assigned to the worker task.

The dispatcher is responsive to a remote procedure call request for receiving the buffer directly into the dispatcher shared memory space of the worker task selected to execute the remote procedure call request, setting the semaphore in the worker control block corresponding to the selected worker task, and providing a request acceptance response to the connection mechanism The selected worker task is responsive to the semaphore in the corresponding worker control block for reading the associated parameters from the buffer, performing the assigned remote procedure call request, placing the results of the remote procedure call request into the dispatcher shared memory space of the worker task, and generating a remote procedure call to the dispatcher to indicate that the assigned remote procedure all request has been completed.

The dispatcher is then responsive to the remote procedure call from the worker task for sending the results of the remote procedure call to the connection mechanism directly from the corresponding dispatcher shared memory space.

Finally, the connection mechanism and the server of the present invention include an authorization mechanism. The authorization mechanism includes a directory server for storing access rights of the client and a client mechanism for generating a request for an authorization ticket to the server. The request for an authorization ticket includes an identification of the client and is in association with an operation call to the server.

An authorization mechanism generates a corresponding authorization ticket wherein the authorization ticket includes the access rights of the client and is encrypted with an encryption key derived from the password of the server and the connection mechanism sends the authorization ticket to the server mechanism in association with the operation call. The server then decrypts the authorization ticket with the server password and obtains directly the access rights of the client to the server resource.

The directory server of the authorization mechanism further stores information regarding the client that required by the server in executing the operation call, including access rights information, and the authorization ticket request generated by the client mechanism further includes an identification of the client information required by the server in executing the operation call. The authorization mechanism is responsive to the ticket request for placing the requested information into the encrypted authorization ticket and the server decrypts the authorization ticket and reads the information required to execute the operation call directly from the decrypted authorization ticket, including the access rights of the client.

Other features, objects and advantages of the present invention will be understood by those of ordinary skill in the art after reading the following descriptions of a present implementation of the present invention, and after examining the drawings, wherein:

DETAILED DESCRIPTION

The following will first provide a general description of a system incorporating the present invention, and then will describe the component mechanisms of the system in detail, beginning with the connection mechanisms of the present invention, then describing the server mechanism and finally the security mechanism.

A. Description of the Connection Mechanisms (FIGS. 1, 2A, 2B, 2C, 3, 4A, 4B, 4C, 4D)

The following will discuss the overall structure and operation of the connection mechanism of the present invention and will then discuss the basic connection configurations supported by the connection mechanism. The data structures used by the connection mechanism will then be discussed in further detail, followed by a discussion of the creation and deletion of connections and sessions by the connection mechanism and certain of the routines used in these operations. The execution of client operations through the sessions and connections will then be discussed in detail.

1. General Description of the Connection Mechanism (FIG. 1)

Figure 1:
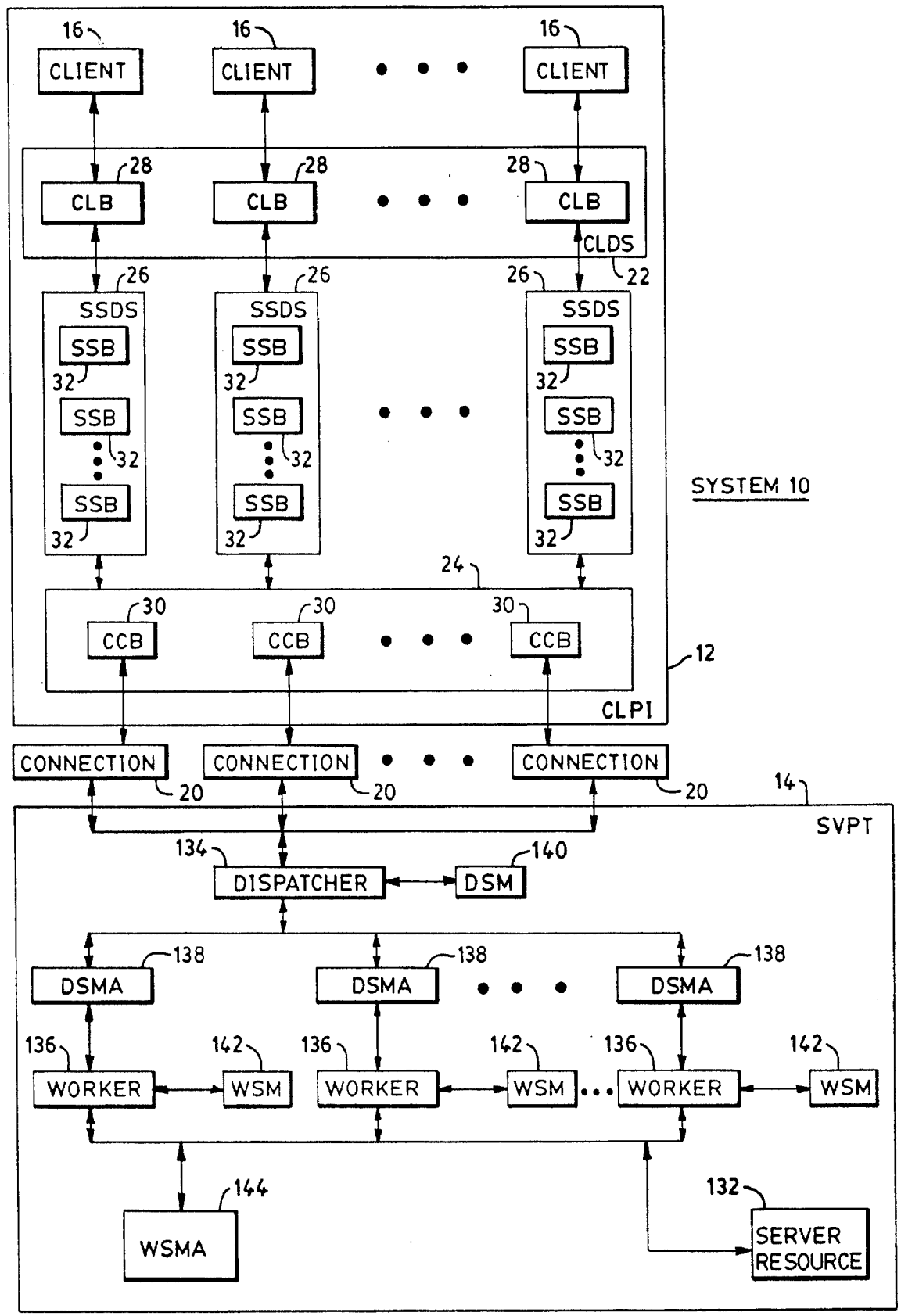
FIG. 1 is a diagrammatic representation of the system of the present invention.

Referring to FIG. 1, therein is shown a general block diagram representation of the connection mechanisms provided by a System 10 incorporating the present invention. As shown therein, System 10 is comprised of a Client Platform (CLPT) 12 and a Server Platform (SVPT) 14 which may be one of one or more Server Platforms (SVPTs) 14 wherein there are one or more Clients 16 are residing on CLPT 12 and one or more Servers 18 residing on each SVPT 14 and wherein CLPTs 12 and SVPTs 14 are connected through one or more Connections 20.

Operations between Clients 16 and Servers 18 are executed through sessions associated with Connections 20 wherein, for purposes of the following discussions, a Connection 20 is defined herein as logical communication path between a CLPT 12 and a Server 18 and a session is defined as a logical association between a Client 12 and a Server 18. As is well understood in the art, Connections 20 may be provided both as local connections and as network connections, and, in the present example of an implementation of System 10, each Client 16 is an application program executing under control of a user and a single user may control one or more application programs, each of which will be a Client 16.

The connection mechanisms residing in CLPT 12 include a plurality of data structures which are used in the present invention for controlling and managing the sharing of Connections 20 among Clients 16. These data structures include a Client Data Structure (CLDS) 22 for identifying and managing the Clients 16 having currently executing or pending requests, a Connection Data Structure (CCDS) 24 for identifying and managing Connections 20, and a set of Session Data Structures (SSDSs) 26 relating Clients 16 to Connections 20.

As shown, CLDS 22 includes one or more Client Control Blocks (CLBs) 28 wherein each CLB 28 contains information regarding a corresponding Client 16 or Clients 16. CCDS 24 includes one or more Connection Control Blocks (CCBs) 30 wherein there is a CCB 30 for and corresponding to each Connection 20 to a Server 18 and each CCB 30 contains information regarding the corresponding Connection 20.

Finally, SSDSs 26 each include one or more Session Control Blocks (SSBs) 32 wherein each SSB 32 corresponds to a session between a Client 16 and the Server 18 that is to execute one or more operations the Client 16. Each SSB 32 is associated with a CLB 28, and thus a Client 16, and contains information regarding the corresponding session and identifying the Connection 20 through which the session is to be performed.

As will be described in detail in the following, each session and its SSB 32 is identified by a unique session identifier and each Client 16 operation which is to be executed through the Connection 20 involved in the session is "stamped" with the session identifier. SSBs 32 thereby relate each Client 16 with the Server 18 which is to perform an operation for the Client 16 and the Connection 20 through which the Client 16 operation is to be performed and session identifier "stamped" on each Client 16 operation associates each Client 16 operation with a corresponding session and thus with a corresponding Connection 20.

The client, connection and session data structures thereby allow a Client 16 to operate in terms of requests, calls or commands for operations to be performed for specified Servers 18. The connection mechanisms relate each Client 16 operation to a session and a Connection 20 that are identified through the corresponding SSBs 32 and the CCBs 30, thereby converting each Client 16 operation into a session/connection relationship. The Clients 16 are thereby isolated and insulated from the client to connection relationship and need not deal with the complexities of the client to connection relationship, thereby reducing the burden on the Clients 16 and allowing the Client 16's normal internal mechanisms to generating requests, calls or commands to operate without modification. The connection mechanism also isolates the connection mechanism from Clients 16, thereby allowing the connection mechanism to share Connections 20 among the Clients 16.

2. Connection Configurations (FIGS. 2A, 2B and 2C)

Figure 2A:
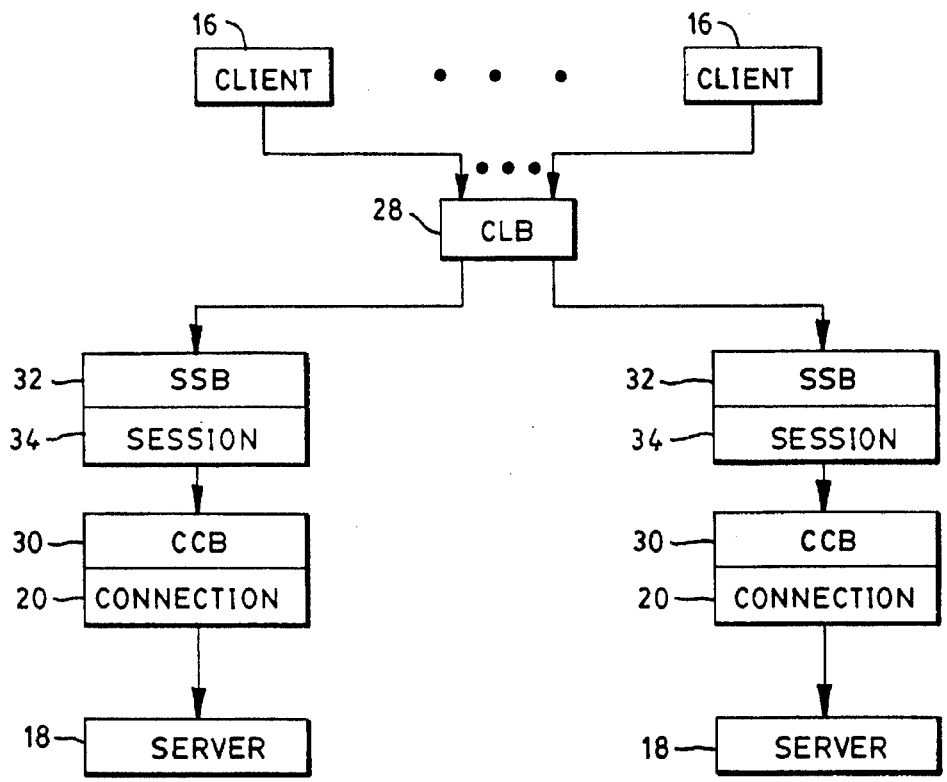
FIGS. 2A, 2B and 2C are diagrammatic representations of connection configurations supported by the system of the present invention.
Figure 2B:
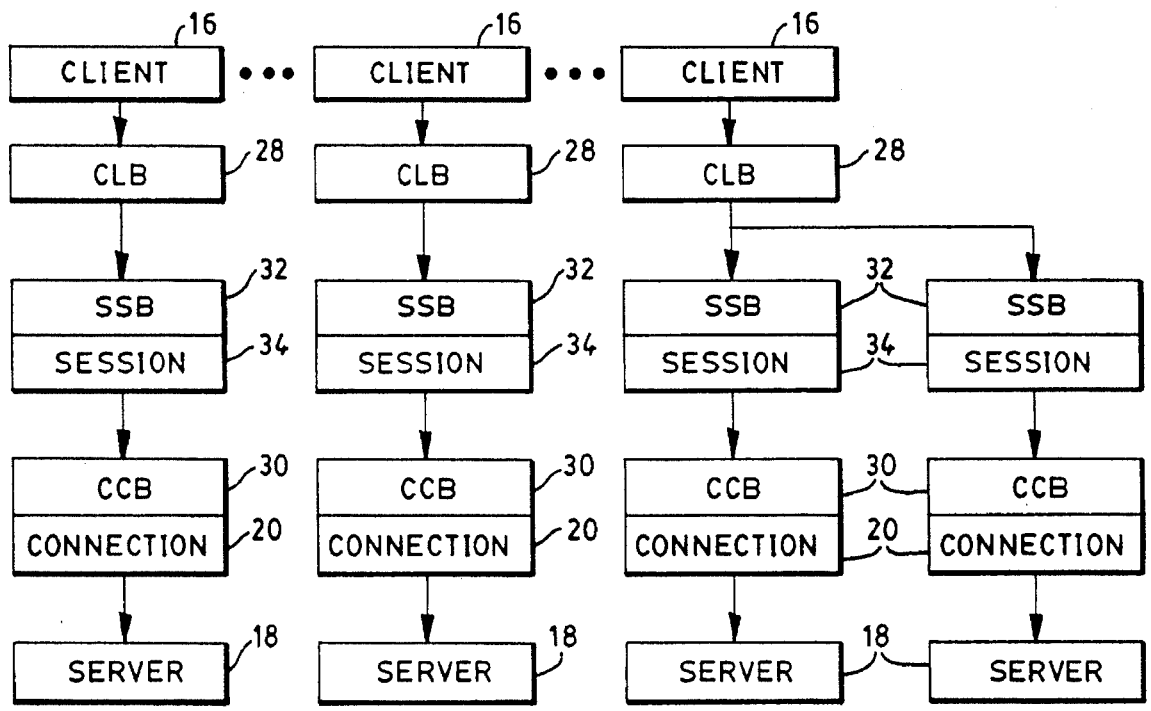
Figure 2C:
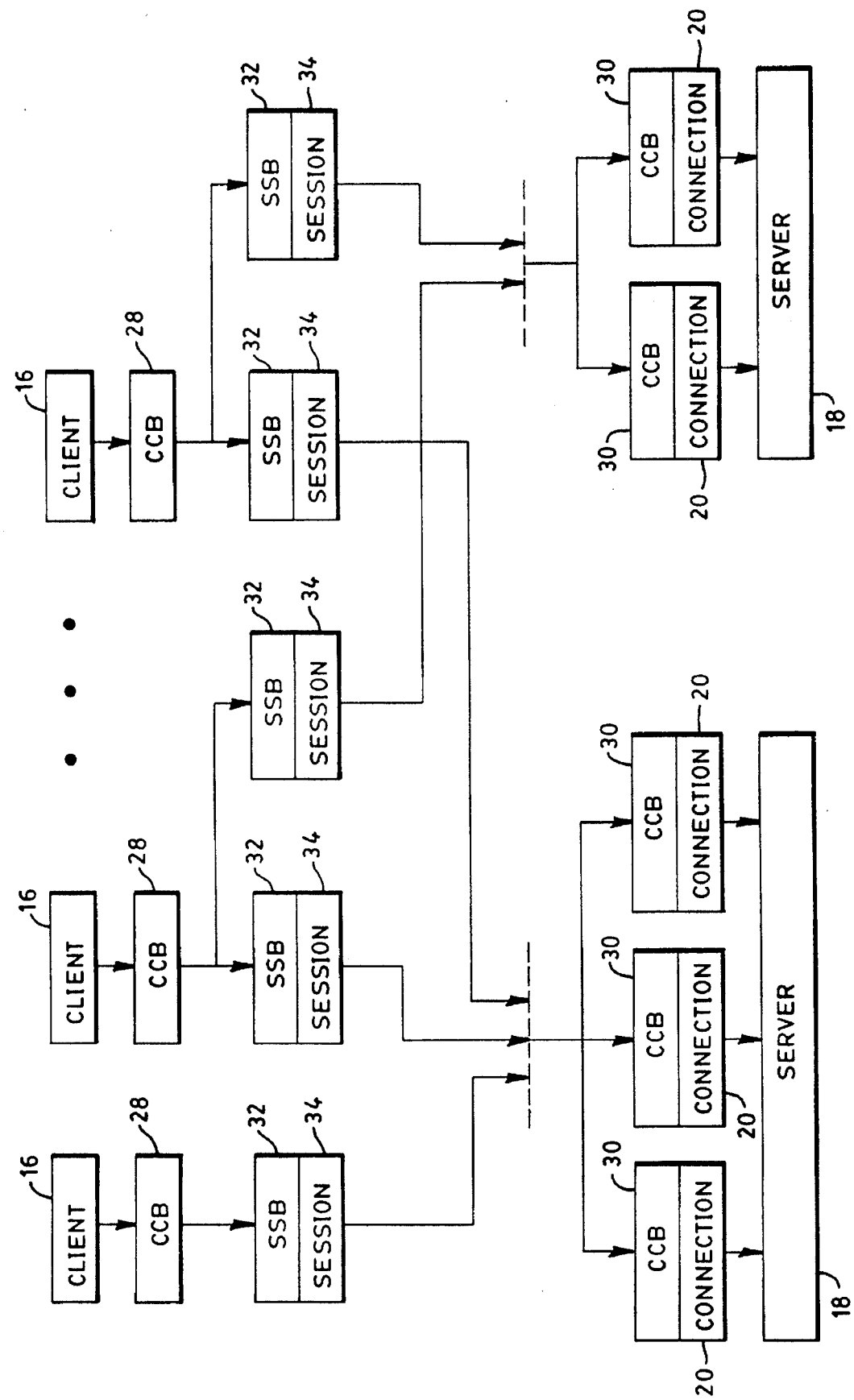

Referring to FIGS. 2A, 2B and 2C, therein are represented three basic connection configurations supported by the connection mechanism of System 10 and referred to herein respectively as the shared connection configuration, the single connection configuration, and the connection pooling configuration. The connection mechanism is not, however, limited to these specific configurations and other configurations may be constructed using the general elements of the connection mechanism as described herein.

In the shared connection configuration represented in FIG. 2A, there is a single Session 34 for each Connection 20 and a single Connection 20 for each Server 18 while two or more Clients 16 may share a CLB 28 and the CLB 28 may be associated with two or more Sessions 34. The two or more Clients 16 will thus appear as a single Client 16 to a Session 34, because of the shared CLB 28, and may thus share the Connection 20 associated with the Session 34.

In the single connection configuration represented in FIG. 2B, there is again a single Session 34 for each Connection 20 and a single Connection 20 for each Server 18. While there may be two or more Sessions 34 associated with each CLB 20, there is a single CLB 20 associated with each Client 16. As a result, Connections 20 are not shared among Clients 16 and, while each Client 16 may have more than one Connection 20, each Connection 20 will be used by a single Client 16.

In the connection pooling configuration shown in FIG. 2C, there will be one CLB 28 for each Client 16 and there will be one or more Sessions 34 for each Client 16. There may, however, be more than one Connection 20 for each Server 18, and more than one Session 34 for each Connection 20, so that the Clients 16 share a pool of Connections 20 to each Server 18.

B. Detailed Description of the Connection Mechanisms (FIGS. 3, 4A, 4B, 4C, 4D, 4E and 4F)

The connection mechanism described above will perform several types of operations in response to corresponding operation calls from a Client 16. Three of these operations are related to the creation and deletion of connections to servers while another type is comprised of server operations, such as data read and write operations to be executed by a server on behalf of a client. It is to be understood that the specific form in which a Client 16 issues requests for operations to the connection mechanism will depend upon the particular native mechanisms of the Client 16 and that the requests issued by a Client 16 to the connection mechanism are referred to herein as operation calls for connection and session operations and for server operations for convenience in the following descriptions.

The following will first discuss the operation of connection mechanism operations related to the creation and deletion of connections and sessions between the clients and the servers at a general level. The operation of the connection mechanism will then be described in detail and this description will include detailed descriptions of the client, connection and session data structures created by the connection mechanism in response to operation calls by the clients, including those for server operations.

1. Initialize and Bind/Unbind Operations

The operations performed by the connection mechanism in creating and deleting connections and sessions between clients and servers in response to corresponding calls by the clients include the initialize, bind and unbind operations. The initialize operation initializes a user application as a Client 16 while the bind and unbind operations respectively bind the Client 16 to a server and unbind the Client 16 from the server, including establishing and deleting connections and sessions and opening and closing data objects in the server as necessary for the bind or unbind operation.

It should be noted that, having executed the initialize operation, a Client 16 may then issue one or more bind/unbind operation calls to establish and delete connections and sessions with servers and need not execute the initialize call again unless the user application has issued a quit call to remove itself as a Client 16. As will be described in the subsequent detailed description of the connection mechanism, a Client 16, having executed the initialize call to become a Client 16 and having executed a bind call to establish a connection and session to a server, may then issue calls for server operations through the connection and session for so long as the connection and session exist.

Bind and unbind operations may be either explicit operations or implicit wherein an explicit bind occurs when a Client 16 specifically requests to be bound to a server through a Connection 20. An implicit bind occurs when a Client 16 generates a call for an operation, such as opening a data object or a data read or write, which implicitly requires that the Client 16 be bound to a server through a Connection 20. The present connection mechanism tracks the numbers of such requests separately but, in an alternate embodiment, may track both types of request with a single count.

The specific sequence of steps performed in each of these operations will depend upon whether the connection mechanism is to operate in the shared connection configuration, the single connection configuration, or the connection pooling configuration and whether the connection data structures required to complete a given operation already exist or must be created.

Shared Connection Configuration

The sequence of steps for each operation for the shared connection configuration are:

Initialize

Determines whether a CLB 28 exists and, if not, creates a CLB 28. As described above, a CLB 28 is shared by two or more Clients 16 in this connection configuration and a CLB 28 may therefore already exist.

Explicit Bind

Determines whether a CCB 30 and a SSB 32 exists for the connection and session and creates a CCB 30 and/or a SSB 32 as necessary if either or both do not already exist. Makes a call to the server to obtain a session identifier for the session if the SSB 32 did not already exist. Increments the explicit bind count for the session.

Implicit Bind

Performs the same sequence of steps as for the explicit bind but makes a call to the server to open the data object, if necessary, and increments the implicit bind count for the session.

Explicit and Implicit Unbind

The explicit and implicit unbind operations respectively decrement the explicit and implicit bind counts for the session and the implicit unbind also closes the data object. If both the explicit and implicit bind counts for a session go to zero for a given session, the CCB 30 and SSB 32 will be deleted. The CLB 28 will not be deleted when the CCB 30 and SSB 32 are deleted as there may be more than one client using the CLB 28. The CLB 28 is deleted upon a specific QUIT call from the last client using the CLB 28.

Single Connection Configuration

The sequence of steps for each operation for the single connection configuration are:

Initialize

As described above, in the single connection configuration there is a CLB 28 for each client. The steps executed by the connection mechanism for initialization of a client the single connection are the same as in the shared connection configuration except that the connection mechanism determines whether there is a CLB 28 already in existence for the individual client and creates a CLB 28 if a CLB 28 does not already exist for that client.

Explicit and Implicit Binds

The steps executed for the explicit and implicit bind operations in the single connection configuration are the same as for the shared connection configuration except that the connection mechanism will create a CCB 30 and a SSB 32 for that individual client if a CCB 30 and a SSB 32 do not already exist for that client.

Explicit and Implicit Unbinds

The steps executed for the explicit and implicit unbind operations in the single connection configuration are the same as for the shared connection configuration except that, as described, there is a CLB 28 for each client. The CLB 28 for a client will therefore be deleted when the explicit and implicit bind counts for the last SSB 32 of the client both go to zero or when the client issues a QUIT call.

Connection Pooling Configuration

The sequence of steps for each operation in the connection pooling configuration are:

Initialize

As in the single connection configuration, there is a CLB 28 for each client and the steps executed in the connection pooling configuration are the same as for the single connection configuration.

Explicit and Implicit Binds

As described above, in the connection pooling configuration there is a pool of connections shared among the clients wherein each pool of connections is associated with a given server. The connections in a pool are therefore associated with a server, and not with a client or clients. Upon a bind call, the connection mechanism will determine whether there exists a connection pool associated with the server designated in the call and, if such a pool does not exist, will create a connection pool for the server. A connection pool is therefore created for a given server upon the occurrence of the first bind call to the server by any client.

As also described for the connection pooling configuration, each client has an SSB 32 and corresponding Session 34 for each server to which it is connected. Therefore, and even if a connection pool to the server was found to already exist, the bind operation will then determine whether an SSB 32 and Session 34 already exists between the client and the designated server and, if not, will make a call to the server to obtain a session identifier and will create an SSB 32.

Explicit and Implicit Unbinds

The explicit and implicit unbind operations for the connection pooling configuration will be essentially the same as for the single connection configuration except that, as described, the connections of a connection pool to a server are shared among the clients connected to that server and are therefore associated with the servers rather than with the clients. As such, the CCBs 30 of a connection pool will not be deleted until all the client sessions to the server through the connections of the pool have ended.

2. Description of Connection Mechanism Data Structures and the Execution of Data Operations (FIGS. 3, 4A, 4B, 4C, 4D, 4E and 4F)

As described above, a user application will issue an initialize call to the connection mechanism to become a Client 16 and may then issue one or more bind/unbind operation calls to establish and delete connections and sessions with servers. Having executed a bind call to establish a connection and session to a server, a Client 16 may then issue one or more calls for server operations.

The following will describe in detail the data structures created and used by the connection mechanism in implementing the above described operations and for executing server operations and the connection mechanism elements associated with these data structures. The following descriptions are not based upon any specific connection configuration as the connection configurations and the steps executed by the initialize and bind/unbind operations for each configuration have been discussed above, but should be read as generally applicable to any connection configuration.

Figure 3:
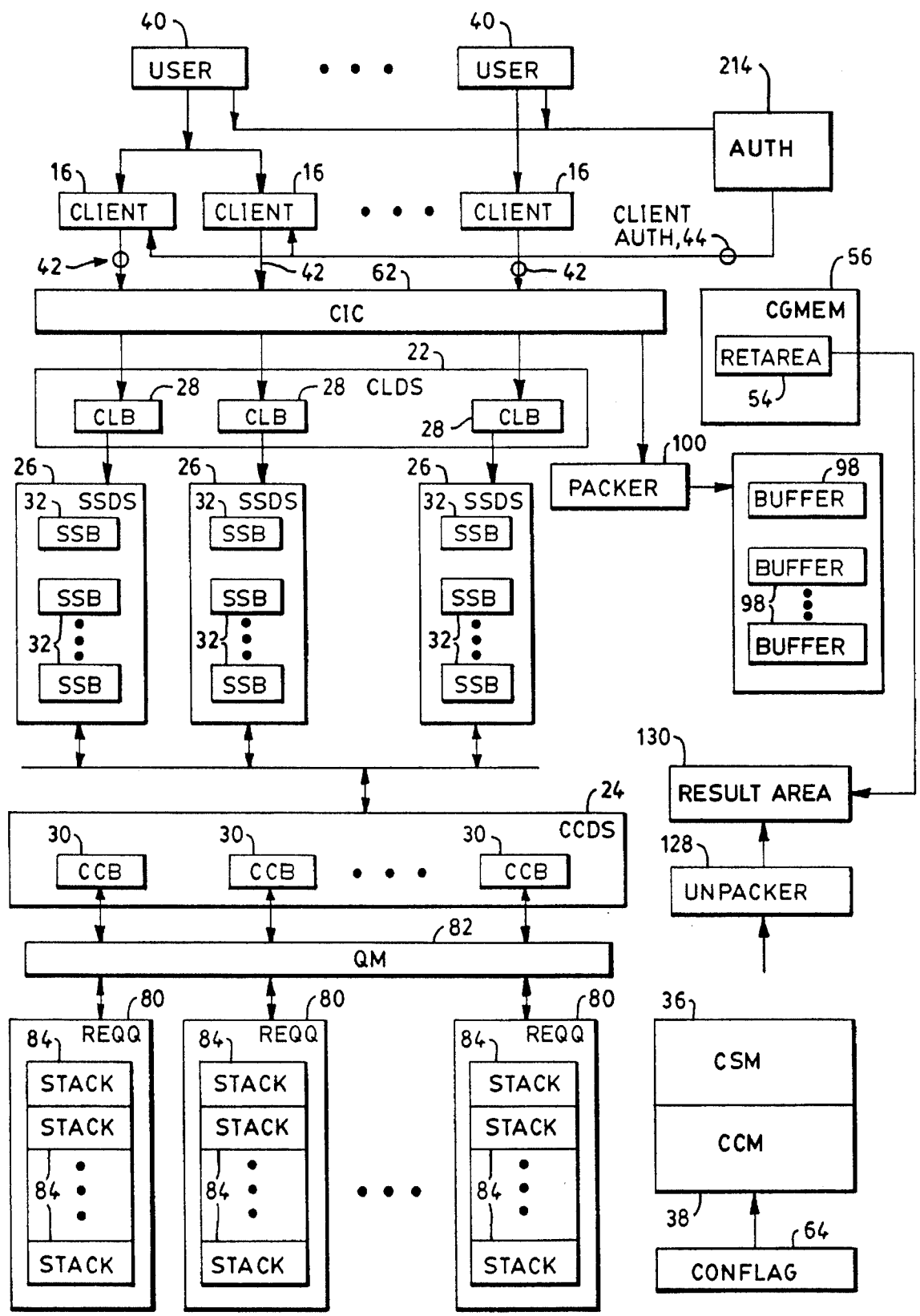
FIG. 3 is a block diagram of a connection mechanism of the system of the present invention.

FIG. 3 presents a detailed block of the connection mechanism and includes elements of the connection mechanism not previously shown in FIG. 1. For purposes of clarity in the following detailed discussions, FIG. 3 will focus on the individual functional elements of the connection mechanism, for example, on a single CLB 28, a single CCB 30 or a single SSB 32, and upon the connection mechanism structures and mechanisms associated therewith and with execution of server operations. It will be understood with respect to FIG. 3 that, where a single element is shown and described with reference to FIG. 3 that also appears in other Figures as a plurality of like elements, the description of such an element will apply to the like elements.

Referring to FIG. 3, the connection mechanism includes a Connection State Machine (CSM) 36 which executes the basic connection/session operations and manages the basic operations for executing server operations across Connections 20. In the present implementation of the connection mechanisms CSM 36 is a commercially available program referred to as Netwise RPC which is available from Netwise Corporation of Boulder, Colo. CSM 36 performs basic connection and communication operations and the functions, data structures and operations which use CSM 36 in implementing the connection mechanisms of the present invention comprise the subject matter which is described in detail herein. Thus, CLBs 28, SSBs 32 and CCBs 30 and the related data structures and mechanisms to implement the present connection mechanism are added to the basic mechanism provided by CSM 36.

The control and function mechanisms added to CSM 36 include a Customization Code Mechanism (CCM) 38 which interacts with CSM 36 to create, manage and use the connection mechanisms of the present invention. CCM 38 is represented generally in FIG. 3 as CCM 38 and certain functions and routines which are included in CCM 38 will be described together at a later point in the following. Other of the elements of CCM 38 and their functions and operations are represented and discussed individually for a clearer understanding of the structures and operations of the connection mechanisms of the present invention.

System 10 is represented therein as having at least one User 40 controlling one or more Clients 16 wherein, in the present implementation, each Client 16 is an application program which may generate Operation Calls 42, certain of which establish the application program and User 40 as a Client 16, others of which establish Connections 20 and Sessions 34, and others of which are server operation calls. CLPT 12 may be, for example, a single user personal computer or workstation or may be a multi-user computer platform. In the first instance there will be one User 40 which may control a plurality of Clients 16 and in the latter instance there may be two or more Users 40, each of which may control a plurality of Clients 16. In still other systems, Clients 16 may not be application programs but may be operating system tasks or other types of programs that make use of Servers 18. In the present example, however, it will be assumed that the system includes at least one User 40 controlling one or more applications programs which operate as Clients 16 by generating operation calls to a Server 18 through Connections 20.

Figure 4A:
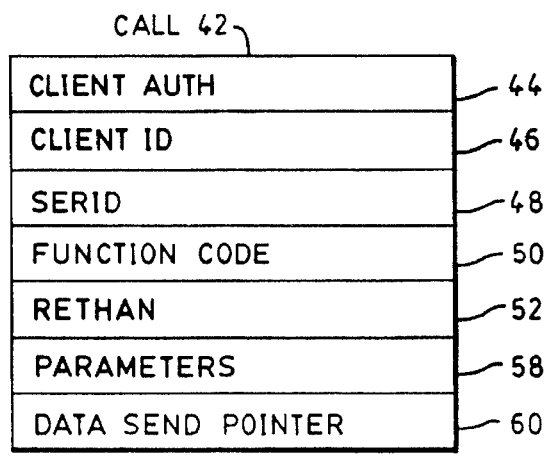
FIGS. 4A, 4B, 4C, 4D, 4E and 4F are control data structures used by the connection mechanism.

As will be described in detail in a following discussion of System 10's authorization mechanisms, a User 40 will initially log onto System 10 and will be provided with a client identification. Thereafter, whenever a User 40 requests access to a Server 18 the authorization mechanism will check the User 40's authorizations and will return a Client Authorization (CLIENTAUTH) 44. The CLIENTAUTH 44 of a given User 40 will then be provided to the Server 18 to identify the User 40 and the User 40's access rights to Servers 18. The authorization and protection mechanism of System 10 is the subject of a later detailed description and will be considered only generally for the present description of the connection mechanism.

a. Operation Calls 42 (FIG. 4A)

Figure 4B:
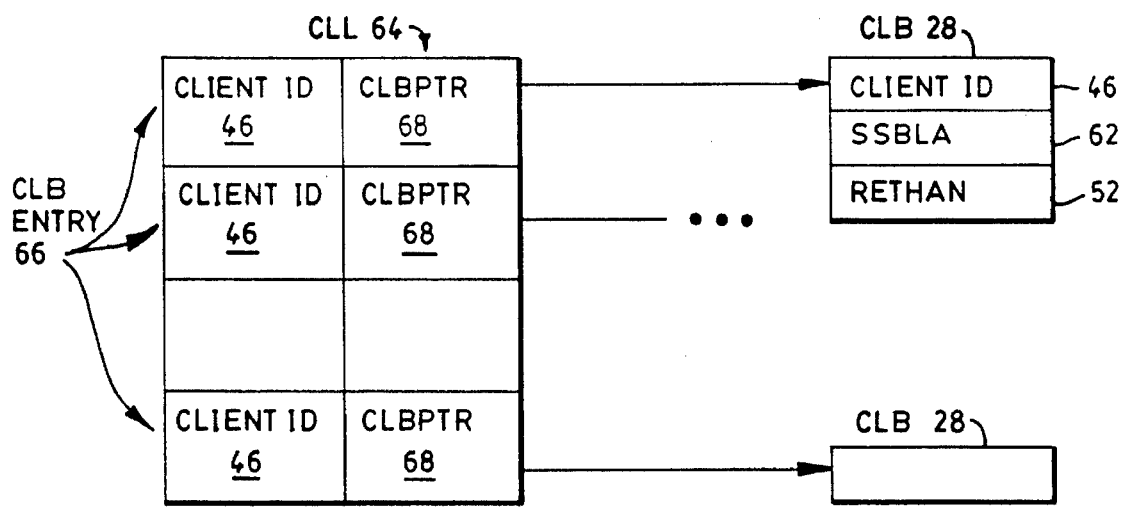

Thereafter, any Client 16 running under control of a User 40 may generate one or more Operation Calls 42. The general format of an Operation Call 42 is illustrated in FIG. 4A wherein it is represented that an Operation Call 42 may include the CLIENTAUTH 44, a Client Identification (CLIENTID) 46 uniquely identifying the Client 16, a Server Identification (SERVID) 48 identifying the server which is to perform the request, a Function Code 50 identifying the particular operation to be executed on behalf of the Client 16. Each Operation Call 42 will also include a Return Handle (RETHAN) 52 identifying a Return Handle Area (RETAREA) 54 in CLPT 12's Global Memory (CGMEM) 56 in which the connection mechanism is to place a pointer or address to any data or parameters returned as a result of the request. Finally, each Operation Call 42 will include any Parameters 58 necessary for execution of the Operation Call 42, wherein Parameters 58 may include a Data Pointer 60 to a location in System 10 memory containing any data that is to be send to the Server 18 in executing the Operation Call 42.

b. Client Control Blocks 24 (FIG. 4B)

As described, the connection mechanism will create CLBs 24, CCBs 30 and SSBs 32 as required by Operation Calls 42 and the connection configuration in which the connection mechanism is then operating. Client Initialize/Connection (CIC) 62 will respond to Operation Calls 42 as necessary to create and delete CLBs 24, CCBs 30 and SSBs 32 and the corresponding Connections 20 and Sessions 30 according to the current connection configuration, which is indicated to CIC 62 by Configuration Flags (CONFLAG) 64.

Each CLB 28 is comprised of the CLIENTID 46, an SSB Linked List Address (SSBLA) 62 to the start of a SSL 122, and RETHAN 52. Each CLB 28 therefore includes the information necessary to identify a corresponding Client 16 and to identify the area of CGMEM 56 wherein the Client 16 expects to receive responses from a Client 16 Operation Call. CLDS 22 may contain one or more CLBs 24 and the CLBs 24 are associated through CLL 64 wherein CLL 82 is comprised of one or more CLB Entries 66. Each CLB Entry 66 corresponds to one CLB 24 is comprised of the CLIENTID 66 and a CLB Pointer (CLBPTR) 68 to the corresponding CLB 24.

c. Connection Control Blocks 30, Request Queues 80 and Stacks 84 (FIGS. 3, 4C, 4D, and 4E)

Figure 4C:
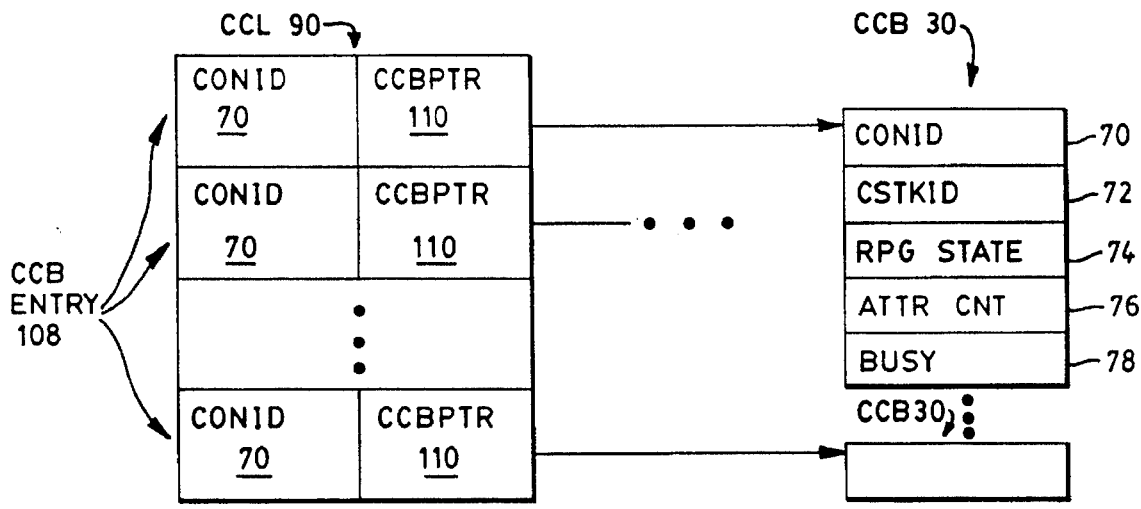

Referring to FIG. 4C, the connection mechanism maintains a CCB 30 for each Connection 20 and each CCB 28 in turn contains a Connection Identification (CONID) 70, a Current Stack Identification (CSTKID) 72, Remote Procedure Call State (RPC STATE) 74, an Internal Attribute Count (ATTRCNT) 76, and a Busy flag 78.

Returning to FIG. 3, FIGS. 4D and 4E to discuss the functions of CSTKID 72, RPC STATE 74, ATTRCNT 76, and Busy 78, it has been previously described that there is a CCB 30 for each Connection 20. There may be a plurality of Sessions 34 associated with each Connection 20 and each Session 34 associated with a Connection may the source of one or more pending Operation Calls 42 that require communication with a Server 18 through the Connection 20.

A Connection 20 will execute one Operation Call 42 at a time and will be essentially dedicated to its currently executing Operation Call 42 until completed. As a consequence, any Connection 20 may be executing one Operation Call 42 and may have one or more Operation Calls 42 awaiting execution. As indicated in FIG. 3, therefore, each CCB 30 has associated with it a Request Queue (REQQ) 80 for storing the Operation Call 42 currently being executed through the Connection 20 and any pending Operation Calls 42 that are to be executed through the Connection 20. A Request Queue Manager (RQM) 82 is provided for managing the REQQs 80.

Each Operation Call 42 that requires communication with a Server 18 will be executed as a sequence of Remote Procedure Call (RPC) requests to the Server 18. Each RPC request is comprised of an RPC call and a corresponding RPC response and the sequence of RPC requests corresponding to a given Operation Call 42 is stored in a REQQ 80 in the form of a Stack 84 while the parameters associated with the RPC calls and returns are communicated in packed buffers.

Figure 4D:
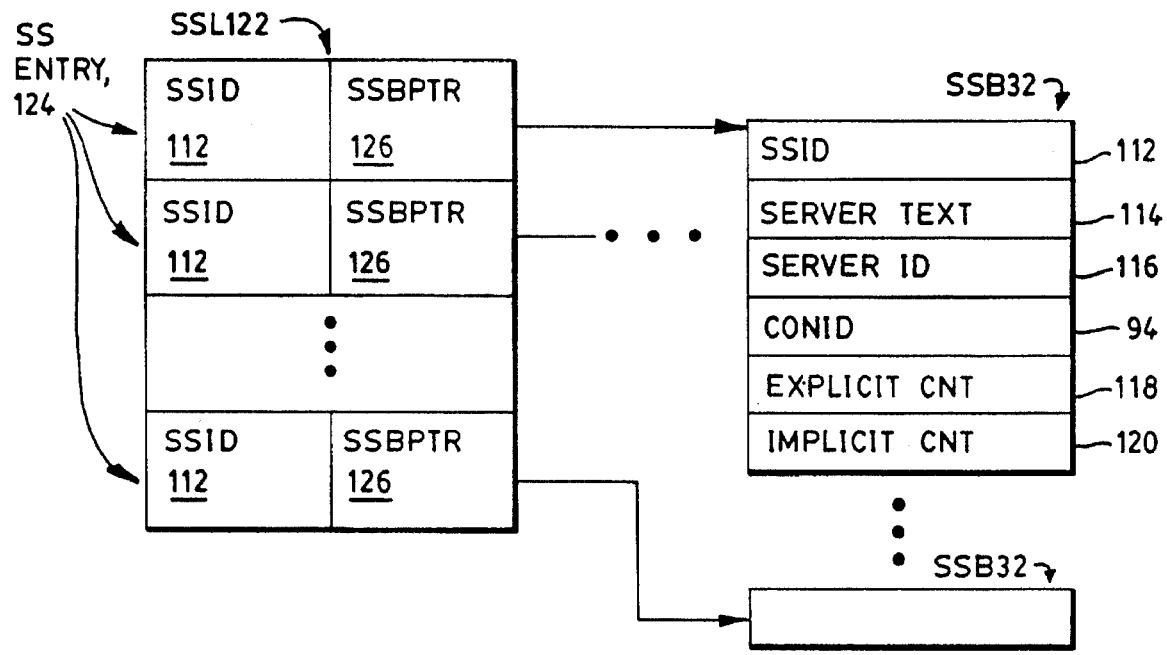

The general structure of a Stack 84 is illustrated in FIG. 4D. As shown, each Stack 84 includes a Stack Identifier (STKID) 86 wherein the STKID 86 of the Operation Call 42 currently being executed through the corresponding Connection 20 is stored in the CCB 30 of the Connection 20 as CSTKID 72. Each Stack 108 further includes Session Identifier (SSID) 88, to identify the Session 22 through which the Request 60 is being executed, and a Process Identifier (PROCID) 90 identifying the Client 16 which was the source of the Operation Call 42 resulting in the Stack 84. Each Stack 84 will also contain RETHAN 72, thereby identifying the location in CGMEM 76 in which the connection mechanism is to place pointers to messages resulting from the connection mechanism operations and, when the Operation Call 42 is completed, a pointer to the results returned from the Operation Call 42.

Each Stack 84 also contains a Sequence 92 of the RPC Requests 94 corresponding to the Operation Call 42, one of which may be a send request which contains a Buffer Pointer (BUFPTR) 96 to a Buffer 98 containing the parameters of the Operation Call 42 corresponding to the Stack 84 and the execution of which will result in the Buffer 98 being sent to the server mechanisms.

Figures 4E, 4F, 6C:
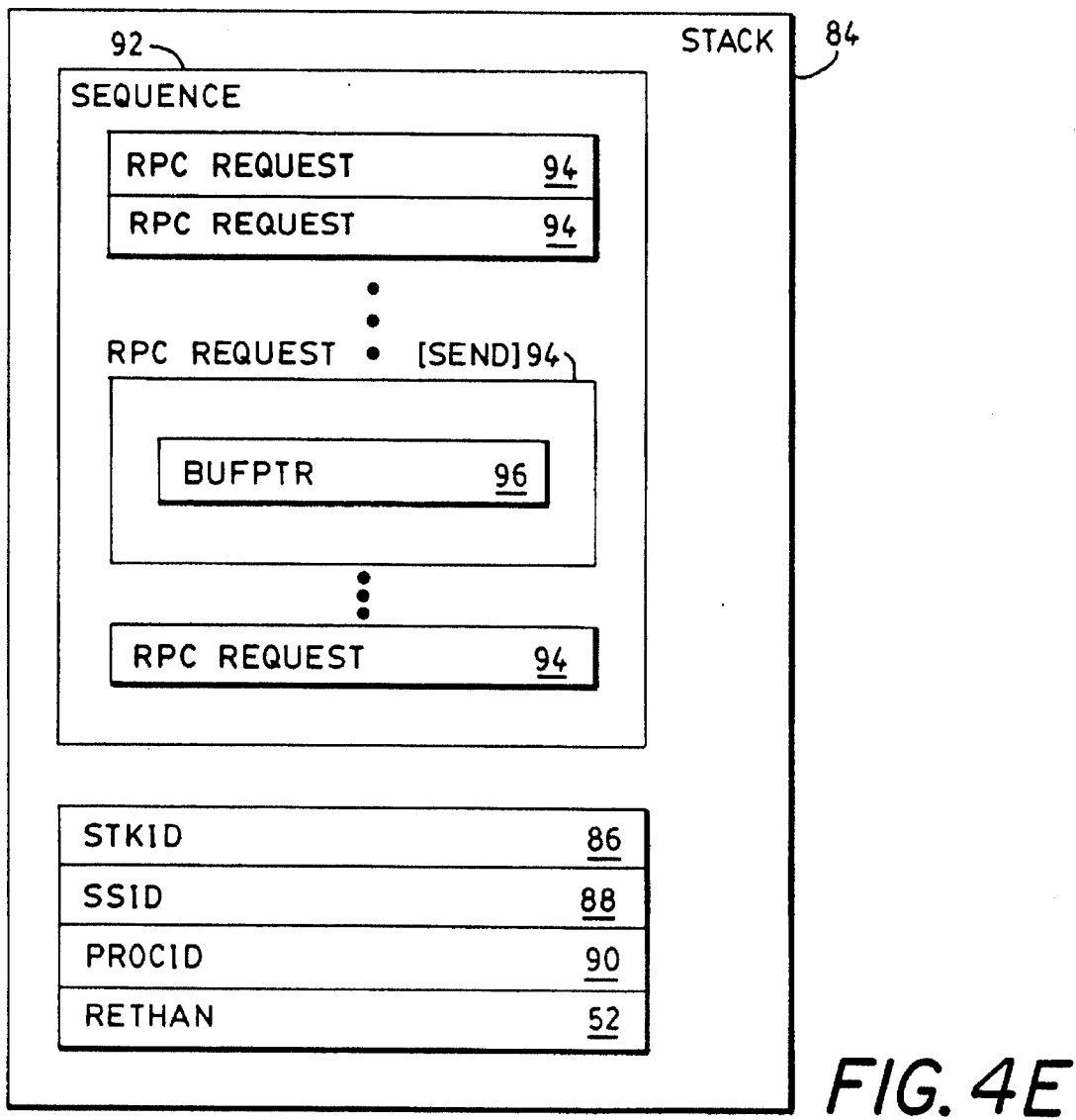

Referring to FIGS. 3 and 4E, CCM 38 will respond to an Operation Call 42 by invoking Packer 100 which will create a corresponding Buffer 98 from the Operation Call 42. The general structure of a Buffer 98 created from an Operation Call 42 is illustrated in FIG. 4E.

As shown in FIG. 4E, a Buffer 98 will contain a Remote Procedure Call Code (RPCCODE) 102 identifying the operation requested by the Client 16 in the Operation Call 42 and a set of Parameters 104 containing the essential perimeters of the Operation Call 42, including any data that is to be sent to the Server 18.

Returning to FIG. 4C and the structure of a CCB 30, in addition to CSTKID 72, the STKID 86 of the Stack 84 currently being executed, each CCB 30 will also store the state of execution of the currently executing RPC request of the currently executing Stack 84 as RPC STATE 74. The possible RPC request execution states in the connection mechanism include initialize, pack, send, receive, and unpack. As will be described with regard to Servers 18, a Server 18 is similarly controlled by the current state of execution of the RPC request and the possible RPC request states that occur in the server mechanisms include receive, unpack, function call, pack and send.

Of the remaining fields of each CCB 30, ATTRCNT 76 is used to store representing the number of attributes (parameters) involved in a current RPC request and is used by the connection mechanisms when unpacking buffers to speed up the unpacking operations by indicating how much memory will be required in unpacking a buffer. The Busy flag 78 contains a value indicating whether the corresponding Connection 20 is presently executing an Operation Call 42 or has one or more Operation Calls 42 pending for execution.

Finally, as described, CCDS 24 may contain one or more CCBs 30 and the CCBs 30 are associated through CCL Linked List (CCL) 106 comprised of one or more CCL Entries 108. Each CCL Entry 108 corresponds to one CCB 30 is comprised of the CONID 70 and a CCB Pointer (CCBPTR) 110 to the corresponding CCB 30.

d. Session Control Blocks 32 (FIG. 4F)

Referring to FIG. 4F, each SSB 32 includes a Session Identifier (SSID) 112 which identifies the Session 34 to which the SSB 32 belongs. If, as described above, it is necessary for CIC 62 to create a new SSB 32, CIC 62, CCM 38 and CSM 36 will execute a remote procedure call to the Server 18 designated in the Operation Call 42 to a new Session 34 to the Server 18 named in the Operation Call 42. If the Server 18 can support a new Session 34, the server will establish the new Session 34, will generate a unique SSID 112 for the new Session 34, and will execute a remote procedure response to return the SSID 112 to the connection mechanisms. CIC 62 will then construct the new SSB 32 with the new SSID 112.

Each SSB 38 will also include the Connection Identification (CONID) 70, which is obtained from the corresponding CCB 30 when the Session 34 is established, a Server Text 114, which is a text string identifying the Server 18 which is involved in the Session 34, and a Server Identification (SVRID) 116, which also identifies the Server 18.

Each SSB 32 further includes an Explicit Count Value (Explicit) 118 and an Implicit Count Value (Implicit) 120 which are used to track the number of Operation Calls 42 currently being executed or awaiting executing in the corresponding Session 34. As described, Operation Calls 42 for a Connection 20 may be explicit or implicit and the present connection mechanism tracks the numbers of explicit and implicit calls separately but, in an alternate embodiment, may track both types with a single count. CIC 80 will increment and decrement Explicit 118 and Implicit 120 to indicate the addition of new Operation Calls 42 to the Session 32 and the completion of Operation Calls 42 from the Session 32. CIC 80 and CCM 56 track the number of Operation Calls 42 represented in Explicit 122 and Implicit 124 to determine when the corresponding Session 34 has no further outstanding Operation Calls 42 and may be deleted.

Lastly, the SSBs 32 associated with a CLB 28 through a SSB Linked List (SSL) 122 comprised of one or more SSL Entries 124 wherein each SSL Entry 124 corresponds to a SSB 32 and contains the SSID 114 of the SSB 32 and a SSB Pointer (SSBPTR) 126 to the corresponding SSB 32.

e. CIC 62 Routines Finally, in addition to the above described functions provided by CIC 62, CIC 62 includes a plurality of routines used in the execution of the above described operations of the connection mechanisms. Certain of these routines are described below, and the operation of these routines will be well understood by those of skill in the art after study of the above discussion of the operations of the connection mechanisms.

These CCM 38 routines include:

clb Create:

Create the client control block linked list.

Parameters:

Returns: clb root (address of first clb in clb linked list) and size of clb.

clb Find:

Find the clb in the clb linked list

Parameters: client identification of client to locate in clb linked list

Returns: the pointer (clb ptr) to the appropriate client control block if found in the linked list.

clb Add:

Add the client control block to the linked list.

Parameters: the identification of the client to add to the linked list (client_id).

Returns: the identification of the client added to the linked list (clb_ptr).

clb Free:

Free the client control block from the linked list.

Parameters: pointer to a client control block to be freed (clb_ptr).

Returns: true if done, false if not done.

ssb Create:

Create the session control block linked list if it does not exist.

Parameters: pointer to a client control block for which the ssb linked list is to be created.

Returns: true/false ssb Name:

Find the ssb in the linked list via server text.

Parameters: pointer to a client control block indicating the client whose ssb is sought (clb_ptr); pointer to TEXT string indicating the name of the server whose ssb is sought.

Returns: a pointer to the ssb (ssb_ptr).

ssb Find:

Find the ssb in the linked list via the server identification (server_id).

Parameters: pointer to a clb indicating the client whose ssb is sought (clb_ptr). pointer to a WO_SERVER variable indicating the identification of the server whose ssb is sought (server).

Returns: pointer to the ssb if found (ssb_ptr).

ssb Connection:

Find the ssb in the linked list via the connection identification (connection_id).

Parameters: pointer to a clb indicating the client whose ssb is sought (clb_ptr). value of the connection identification to be sought (connid).

Returns: a pointer to the ssb if found (ssb_ptr).

ssb Add:

Add the ssb to this client's linked list.

Parameters: pointer to a ccb indicating the client for whom the ssb is to be added (clb_ptr); pointer to a TEXT string indicating the name of the server (server_text); pointer to a WO_SERVER variable indicating the identification of the server (server); the session identification for the ssb (session); the connection identification for the ssb (connection).

Returns: pointer to the newly added ssb (new_ssb-ptr).

ssb Free:

Remove the ssb from this client's linked list.

Parameters: none

Returns: true/false ssb Next:

Returns the next ssb pointer following the input ssb pointer.

Parameters: pointer to the input (current) ssb (ssb-ptr).

Returns: pointer to the next ssb (next_ssb_ptr)

Note: to be implemented when multiple servers is implemented.

svb Create:

Create the svb linked list.

Parameters: none

Returns: true/false pointer to start of svb linked list (svb_ptr) size of svb ccb Create:

Create the ccb linked list if it does not exist.

Parameters: none

Returns: true/false pointer to start of ccb linked list (ccb_ptr)size of ccb.

ccb Find:

Find the ccb in the linked list.

Parameters: the connection identification for whom the ccb is sought (connection).

Returns: pointer to the connection control block (ccb_ptr).

ccb Add:

Add the ccb to the linked list.

Parameters: identification of the connection for whom the ccb is to be added (connection).

Returns: pointer to the newly added ccb (new_ccb_ptr).

ccb Free:

Remove the ccb from the linked list.

Parameters: pointer to the ccb to be removed (ccb_ptr); pointer to the head of the ccb linked list (ccb_root).

Returns: true/false.

f. Summary of Operation Call Processing

According to the connection mechanism described herein, a Client 16 will generate an Operation Call 42 which will be detected by CIC 62. CIC 62 will then find or create the CLB 24, CCB 30 and SSB 38 as required for the Session 34 and Connection 20 through which the Operation Call 42 is to be executed. CIC 62 will also invoke Packer 100 which will create a Buffer 98 containing a packed buffer constructed from the Operation Call 42 and containing the parameters of the Operation Call 42.

A sequence of RPC requests to execute the Operation Call 42 will constructed as a Stack 84 stored in the REQQ 80 associated with the CCB 30 of the Connection 20. Each Connection 20 will execute one RPC request at a time, and will complete a Stack 84 before proceeding to a next Operation Call 42 whose corresponding Stack 84 is stored in its REQQ 80.

CIC 62 will return a message to the Client 16 which will effectively complete the Operation Call 42 by Client 16 by indicating acceptance of the Operation Call 42. Client 16, which may be either a synchronous or asynchronous process, may thereby resume operation and either generate further Operation Calls 42 or by passing the operating system context to another Client 16.

Each RPC request call/return operation executed from a Stack 84 will be "stamped" will the session identifier and at least certain of the call/return operations will contain the client identifier. The server mechanism, described in following discussions, will execute each of the RPC requests operations sent by the connection mechanisms and will return the results of the operations to the connection mechanisms through the Connection 20 through which the server mechanisms received the call/return operations. The responses returned to the connection mechanism from the server mechanisms will be "stamped" with the session identifier.

The final result of the RPC requests corresponding to an Operation Call 42 is sent to the connection mechanism from the server mechanism as a packed Buffer 100 associated with a server generated remote procedure call wherein the parameters contained in the packed Buffer 100 will include the results generated in response to the Operation Call 42.

CCM 38 and CSM 36 will receive the Buffer 100 returned from the server and will invoke Unpacker 128 which will unpack the Buffer 100 returned from the server into a Return Area 130 of CGMEM 76. Unpacker 128 will place a pointer to Return Area 130 into Return Handle Area (RETAREA) 54 and will provide a message to Client 16 that the results of the Operation Call 42 have been returned.

Each server response to an RPC request from the connection mechanism is "stamped" with the session identifier, so that the SSB 32 is known. As described, each Connection 20 executes one Stack 84 at a time and all server responses to RPC requests from the connection mechanism are sent to the connection mechanism through the Connection 20 through which the RPC request was sent to the server, so that the Connection 20 and CCB 30 are known. The Stack 84 is therefore known and contains a process identifier, so that the Client 16 can therefore be identified.

SSBs 32 therefore relate the Clients 16 as identified through the CLBs 28 with the Connections 20 as identified through the CCBs 30, by identifying a corresponding Session 34, that is, a logical association through the Connection 20 between the Client 16 and a server. SSBs 32 further provide a means for associating each request of a Client 16 operation call with a corresponding Session 34, and thus with a corresponding Connection 20, by providing a means for stamping, or identifying, each request with the session identification.

The connection mechanism described above thereby provides separate and independent mechanisms for managing clients and connections, respectively the client control blocks and the connection control blocks, and provides a third mechanism, the session control blocks, for relating clients and connections. The client, connection and session data structures thereby allow a Client 16 to operate in terms of operation calls to server while system relates each operation call to a session and a connection identified through the corresponding SSBs 32 and the CCBs 30, thereby converting each client/operation relationship into a session/connection relationship. The Clients 16 are thereby isolated and insulated from the connection/server relationship and need not deal with the complexities of the connection/server relationship, thereby reducing the burden on the Clients 16 and allowing the Client 16 normal internal request mechanisms to operate without modification. The connections and servers are likewise isolated from the clients.

The connection mechanism described herein thereby allows flexibility in arranging connection configurations and, in particular, the construction of shared and pooled connection configurations and the user of the system can readily select the particular configuration to be used by setting the appropriate flags of CONFLAG 64.

In this regard, it should be noted that there are certain tradeoffs between the various connection configurations. For example, the shared connection configuration requires only one connection regardless of the number of application programs running on a client platform, thereby conserving connections, and does not require the creation of a new connections or sessions with each new client, thereby decreasing the start-up time for each client. The single connection configuration, however, offers the best throughput rate for a given client and connection but is most expensive in resources and requires increased start-up time for each new client as a new connection and session must be started for each new client. The pooled connection configuration, in turn, does not require the creation of a new connection for each operation, if the connection pool already exists, but does require the creation of new sessions.

In addition, and as will also be described in detail in the following, the Client 16 request mechanisms may be synchronous or asynchronous, without restriction, because the connection mechanism interface with the Clients 16 operates synchronously with respect to Clients 16, thereby satisfying the interface requirements for both synchronous and asynchronous Clients 16. That is, a Client 16 will issue a call for an operation to be performed with respect to a server and the connection mechanism will respond by providing and acceptance of the call to the Client 16, thereby completing the call operation by the Client 16. In the instance of a non-preemtive, pseudo-multitasking Client 16, for example, such as Microsoft Windows and Windows applications programs, a Client 16 is thereby freed to generate further Operation Calls 42 or to pass the operating system context to another application program upon the connection mechanism's response that an Operation Call 42 has been accepted. The connection mechanism will provide the results of the Client 16 call to the Client 16 in a subsequent and separate and operation. The operation of a client system is therefore not held up while waiting a response to a given Operation Call 42, thereby significantly increasing the efficiency of operation of the clients system.

The connection mechanism, however, operates asynchronously with respect to the assignment of connections and the execution of requests through the connections, thereby significantly increasing the efficiency of use of the connections.

Finally, in the present implementation of System 10, CLPT 14 is a single user personal computer or workstation and Clients 12 are Microsoft Windows applications running in the Microsoft Windows environment under control of users. The Server 16 mechanisms of the present implementation are UNIX processes running on the UNIX operating system and providing database services. In other implementations, CLPT 14 may be a multi-user computer platform and Clients 12 may not be application programs but may be operating system tasks or other types of programs and Server 16 may not be a database server, but may be any other form of server, such an electronic mail server or a printer server.

C. Detailed Descriptions of Server Mechanisms (FIGS. 1, 5, 6A, 6B, 6C, 6D and 6E)

1. General Description (FIG. 1)

Referring again FIG. 1 and the Servers 18 of SVPT 14, the RPC requests generated by the connection mechanism as a consequence of Operation Calls 42 for Server 18 operations with respect to a Server Resource 132 are received by a Dispatcher 134 through one or more Connections 20 and Dispatcher 134 in turn communicate the requests to one or more Worker Tasks 136 through corresponding ones of Dispatch/Worker Shared Memory Area (DSMAs) 138. Worker Tasks 136 in turn perform the Client 16 operations with respect to Server Resource 132 and return the results of the operations to Dispatcher 134 through DSMAs 138.

The sequence of operations required for performing an RPC request communicated to Server 18 from the connection mechanism is comprised of a sequence of operations, certain of which are concerned with the reception of requests through Connections 20 and the sending of responses back through Connections 20 and others of which are concerned with the actual operations with respect to Server Resource 132. These operations are divided between the Dispatcher 134 and the Worker Tasks 136 so that the operations for receiving requests, assigning requests to Worker Tasks 136 and sending responses resulting from Worker Task 136 operations back through Connections 20 to the connection mechanism are executed by Dispatcher 42. The operations pertaining to Server Resource 132 are, correspondingly, performed solely by Worker Tasks 136, including the checking of user authorizations and the interpretation and execution of the RPC requests as Server Resource 132 operations.

In this regard, it has been described that each RPC request received from the connection mechanism by Dispatcher 134 is comprised of a remote procedure call and an associated packed Buffer 98 which contains the parameters of the request. Dispatcher 134 receives each such Buffer 98 directly into the DSMA 138 associated with the Worker Task 136 which has been assigned to handle the RPC request and notifies the assigned Worker Tasks 136 that it has a task to perform by setting a semaphore associated with the Worker Task 136. The assigned Worker Task 136 will unpack the Buffer 98 and perform the operation with respect to Server Resource 132 specified by the RPC request. It should be noted that the Worker Task 136 will unpack the buffer from its DSMA 138 and into its own memory space, so that no address translation operation is required.

The Worker Task 136 will, upon completing the specified operation with respect to Server Resource 132, pack the results of the operation directly into a buffer in its DSMA 138 and will issue a remote procedure call to Dispatcher 134, indicating that the operation is completed. Dispatcher 134 will then send the results buffer directly from the DSMA 138 to the connection mechanism, thus completing the RPC request from the connection mechanism.

As shown, there is a Dispatch State Machine (DSM) 140 associated with Dispatcher 134 to control the operations of Dispatcher 134 and an instance of a Worker State Machine (WSM) 142 associated with each Worker Task 136 to control the operations of the associated Worker Tasks 136. Finally, Worker Tasks 136 share a Worker Shared Memory Area (WSMA) 144 through which Worker Tasks 136 communicate and coordinate their operations with respect to Server Resource 132.

Figure 6A:
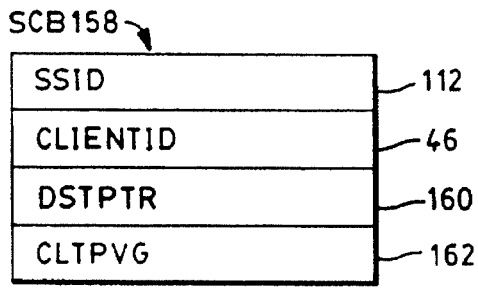
FIGS. 6A, 6B and 6C are control data structures used by the server.
Figure 6B:
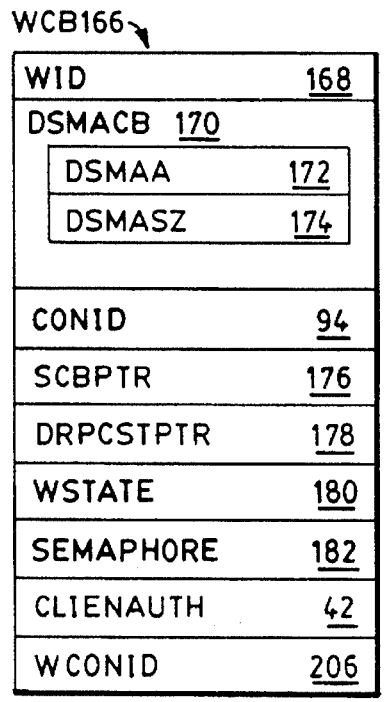

2. Detailed Description of a Server 18 (FIGS. 5, 6A and 6B)

Figure 5:
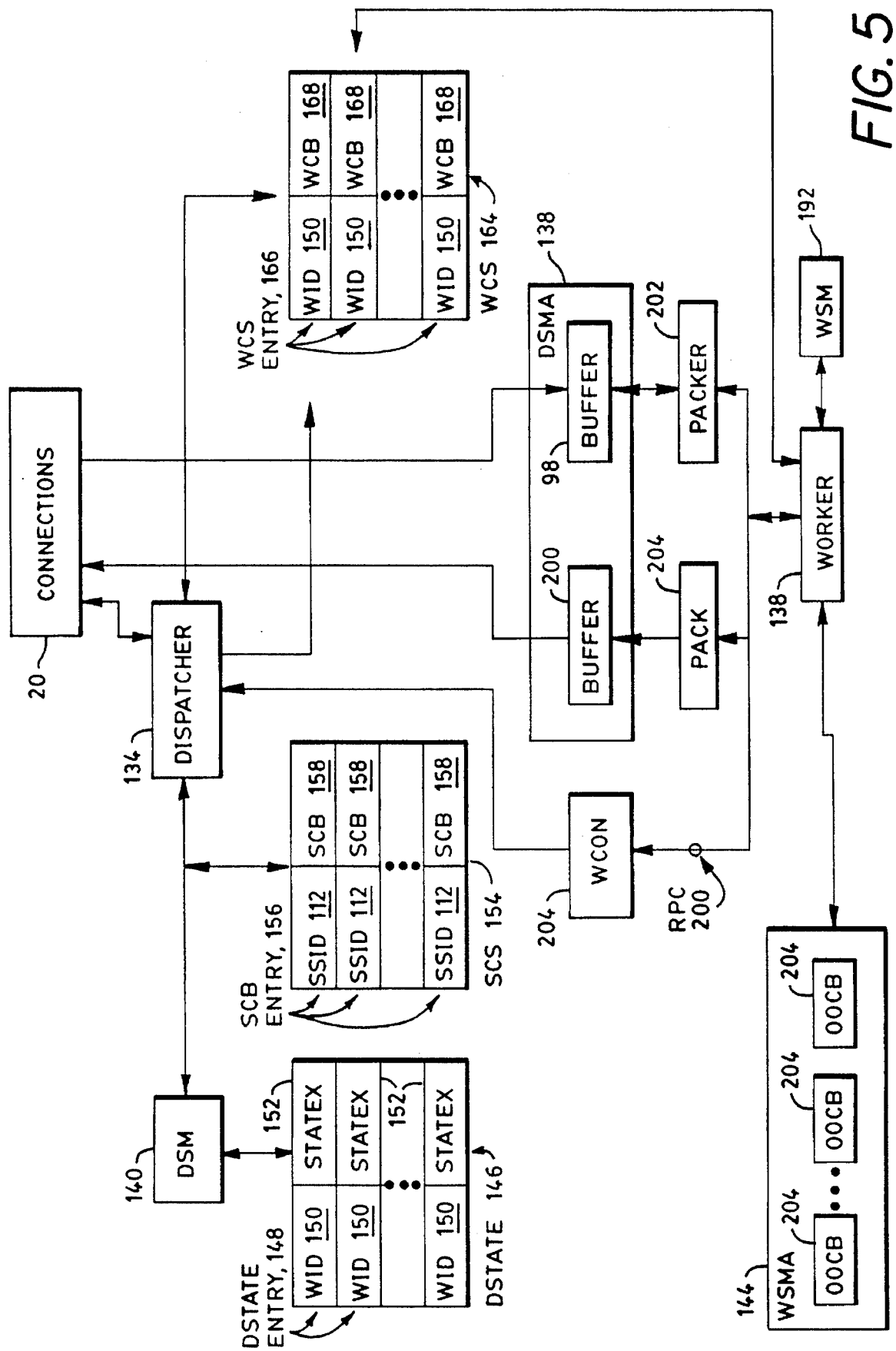
FIG. 5 is a block diagram of a server of the system of the present invention.

Referring to FIG. 5, therein is shown a detailed block diagram of a Server 18 running on SVPT 14, certain elements of which have been previously described with reference to FIG. 1. FIG. 5 shows a single instance of a Worker Task 136 and the structures and mechanisms associated with a Worker Task 136 but it will be understood that the Sever 18 may include a plurality of Worker Tasks 136 and associated structures and mechanisms.

As indicated therein Dispatcher 134 maintains several data structures for controlling operations of Workers 136 and for coordinating the execution of the RPC requests and associated buffers through Connections 20. For example, associated with DSM 140 is a Dispatcher State structure (DSTATE) 146 comprised of an array of Dispatcher State Entries (DSTATE ENTRIES) 148 wherein each DSTATE ENTRY 148 corresponds to an RPC request being executed through a Session 34. Each DSTATE ENTRY 148 is indexed by the corresponding Worker Task Identifier (WID) 150 identifying a corresponding Worker Task 136 assigned to the RPC request and contains the current State of Execution (STATEX) 152 of the corresponding request.

Dispatcher 134 also maintains a Session Control Structure (SCS) 154 comprised of an array of SCS Entries 156, each of which corresponds to a Session 20 through which a Client 16 operation is being performed and contains a Session Control Block (SCB) 158 which is indexed by the corresponding SSID 112 and contains information used by Dispatcher 134 in controlling execution of the corresponding Session 20. As indicated in FIG. 6A, each SCB 158 contains the Session Identifier (SSID) 112, the Client Identifier (CLIENTID) 46, and a Dispatcher State Pointer (DSTPTR) 160 to the corresponding Dispatcher State Entry 1148 in DSTATE 146. Each SCB 154 also contains Client Privileges Field (CLTPVG) 162 containing the access and authorization rights of the User 40.

Finally, Dispatcher 42 maintains a Worker Control Structure (WCS) 164 comprised of an array of plurality of WCS Entries 166, each of which corresponds to a Worker Task 136 and contains a Worker Control Block (WCB) 168 which is indexed by the corresponding WID 150 and contains information relating to control of the Worker Task 136. As indicated in FIG. 6B, each WCB 168 contains the Worker Identification (WID) 150 and a Dispatcher Shared Memory Area Control Block (DSMACB) 170 which in turn contains a Dispatcher Shared Memory Area Address (DSMAA) 172 pointing to the location of the DSMA 46 shared by Dispatcher 42 and the particular Worker Task 136 and a Dispatcher Shared Memory Area Size (DSMASZ) 174 value indicating the size, or capacity, of the DSMA 138 shared by Dispatcher 134 and the particular Worker Task 136.

Each WCB 166 further includes the Connection Identification (CONID) 70 of the Connection 20 through which the corresponding request is being executed and the Session Identifier (SSID) 112 of the Session 20 through which the request is being executed. Each WCB 168 also includes SCB Session Control Block Pointer (SCBPTR) 176 to the SCB 158 corresponding to the RPC request currently being handled by the corresponding Worker Task 136 and a Dispatcher Remote Procedure Call State Pointer (DRPCSTPTR) 178 to the corresponding STATEX 152.

Each WCB 168 also includes a Worker State field (WSTATE) 180 containing flags regarding the current state of the corresponding Worker Task 136, such as whether the Worker Task 136 is idle, busy, in initialization, or being terminated and a Semaphore field (Semaphore) 182 which is set by Dispatcher 134 to initiate the Worker Task 136 operation to handle a new RPC request received from the connection mechanism. Finally, each WCB 168 contains a copy of CLIENTAUTH 42 which is received from the appropriate SCB 158 when the Worker Task 136 is assigned a new RPC request.

Referring again to FIG. 5, therein are illustrated the remote procedure calls and packed buffers exchanged between Dispatcher 134 and a Worker Task 136 through the DSMA 46 associated with the Worker Task 136. As indicated, Dispatcher 134 will receive an RPC request from the connection mechanism and will select a Worker Task 136. The packed Buffer 98 associated with the RPC request will be written directly into the DSMA 138 of the selected Worker Task 136 and Dispatcher 134 will set the Semaphore 182 of the corresponding WCB 166.

The selected Worker Task 156 will respond to the Semaphore 182, will invoke an UNPACK 186 function to unpack the Buffer 298, and will execute the Server Resource 132 operation specified by the RPC request.

Upon completion of the operation, the Worker Task 136 will invoke a Pack function 188 to directly pack the results of the operation into a Buffer 200 in the DSMA 138. Again, no address translation is required when packing the results of the operation into Buffer 200 as DSMA 138 is within the memory space of the Worker Task 136.

The Worker Task 136 will then issue a remote procedure call (RPC) 200 to Dispatcher 134 through a Worker Connection WCON) 204 to indicate that the request has been completed. WCON 204 is created by Dispatcher 134 for the passing of remote procedure calls from a Worker Task 136 to Dispatcher 134 and each such WCON 204 connection is assigned a unique Worker Connection Identifier (WCONID) 106 wherein the WCONID 206 for each Worker Task 136 is stored in the corresponding WCB 168.

Dispatcher 134 send the results Buffer 200 directly from the DSMA 138 to the connection mechanism, thereby completing the RPC request.

In this respect, it should be noted that all communications to Dispatcher 134, whether from the connection mechanism or from a Worker Task 136, are in the form of a remote procedure call communicated through a connection with an associated packed buffer containing the parameters of the call. This both simplifies the design of Dispatcher 134 and insures that a Worker Task 136 cannot preemptively interrupt the operations of Dispatcher 134. For example, it is preferable that Dispatcher 134 delay responding to a remote procedure call from a Worker Task 136 in order to receive and handle another remote procedure call through a Connection 20 from a CLPT 12.

Finally, it will be noted that each Worker Task 136 has access to WSMA 144 wherein information regarding the data objects to which the Clients 16 have requested access is stored and that, as described, this information is used to coordinate access to the data objects by Worker Tasks 136. WSMA 144 is provided for this purpose because, as described, the same Worker Task 136 will not necessary perform all Client 16 operations with respect to a given data object and this information is therefore stored in a central location accessible to all Workers Tasks 136 rather than in the individual Worker Tasks 136.

WSMA 144 is used to store one or more Open Object Control Blocks (OOCBs) 208 wherein each OOCB 208 corresponds to a single data object to which a Client 16 and User 40 has requested access. As shown in FIG. 6C, each OOCB 208 contains an Object Identifier (OBJID) 210 of the corresponding data object, the CLIENTID 46 of the User 40 which has requested and received authorization to access the data object, the CLTPVG 162 containing the privileges of that User 40, and a set of Locks 212 which are set and reset by the Worker Tasks 136 when accessing the data objects to prevent access conflicts between the Workers 136.

3. Summary

To summarize, in the system of the present invention client operation calls are each broken down into a sequence of remote procedure requests by the connection mechanisms. Each remote procedure call request is then individually communicated to the server mechanism as a remote procedure call and packed buffer and the dispatcher running on the server platform dispatches each remote procedure call to a selected one of a plurality worker tasks for execution by placing the packed buffer directly into a shared memory area associated with the assigned worker task and setting a semaphore associated with the worker task. The selected worker task will execute the request and will return the result to the dispatcher through a remote procedure call to the dispatcher and a packed buffer written into the worker's shared memory area. The dispatcher will then send packed result to the connection mechanism directly from the shared memory area.

It can be seen, therefore, that while each connection can support only one remote procedure call at a time, the time required to execute each such remote procedure call is relatively brief compared to the time required to execute an entire client operation in its entirety and that a connection can interleave the remote procedure calls of a plurality of client operations.

It can also be seen from the above that because the dispatcher is required to perform only certain tasks, such as receiving remote procedure call requests, assigning remote procedure call requests to worker tasks, and sending responses from worker tasks back to the client platforms, the burden of operations on the dispatcher is significantly reduced and the rate at which the dispatcher can process requests is significantly increased. In addition, and because the dispatcher passes each remote procedure request to a worker task and saves its state with respect to each remote procedure request passed to a worker task, the dispatcher is free to concurrently process a plurality of remote procedure requests, thereby significantly increasing the number of requests and thereby the number of connections and sessions that the server can handle at any time.

It has been described that Dispatcher 134 communicates with each Worker Task 136 through DSMAs 138 associated with the individual Worker Tasks 136. With regard to the communication of requests from Dispatcher 134 to a Worker Task 136, the packed buffer associated with a request from the connection mechanism is received directly into the DSMA 138 and is unpacked from the DAMS 138 by the assigned Worker Task 136. This reduces the number of required operations by both Dispatcher 134 and the Worker Tasks 136 in that the packed buffers need not be moved from a Dispatcher 134 memory space to a Worker Task 136 memory space and further eliminates the need for address translation operations by either Dispatcher 134 or the Worker Task 136 because the buffer is unpacked within the Worker Task 136 memory space.

In addition, the use of a semaphore to notify the Worker Task 136 that it has a task to perform further reduces the time required for Dispatcher 134 to handle an RPC request as Dispatcher 134 need not wait for an acceptance from the Worker Task 136. Instead, Dispatcher 134 simply sets the semaphore and proceeds to its next operation.

As regards the communication of results from a Worker Task 136 to Dispatcher 134 and back to the connection mechanism, all communications to Dispatcher 134, whether from the connection mechanism or from a Worker Task 136, are in the form of a remote procedure call communicated through a connection with an associated packed buffer containing the parameters of the call. This both simplifies the design of Dispatcher 134 and insures that a Worker Task 136 cannot preemptively interrupt the operations of Dispatcher 134. For example, it is preferable that Dispatcher 134 delay responding to a remote procedure call from a Worker Task 136 in order to receive and handle another remote procedure call through a Connection 20 from a CLPT 12. In addition, and again, this reduces the number of required operations by both Dispatcher 134 and the Worker Tasks 136 in that the packed buffers need not be moved from a Worker Task 136 memory space to a Dispatcher 134 memory space and further eliminates the need for address translation operations by either Dispatcher 134 or the Worker Task 136 because the buffer is unpacked and packed within the Worker Task 136 memory space.

Finally, it should be noted that a given system is not required to implement both the connection mechanism running on the client platforms and the server mechanism running on the server platform. That is, the connection mechanism and the server mechanism are implemented to communicate through remote procedure calls with associated packed buffers containing the parameters of the calls. Thus, the connection mechanism may be implemented with any server mechanism using remote procedure calls and the server mechanism may be implemented with any client connection mechanism using remote procedure calls. In each instance, the advantages deriving from the use of the portion of the present system that is implemented in another system will be realized.

D. Detailed Description of the Authorization Mechanism (FIGS. 3, 5 and 7)

As briefly described above, a User 40 will initially log onto System 10 and will be provided with a client identification. Thereafter, whenever a User 40 requests access to a Server 18 the authorization mechanism will check the User 40's authorizations and will return a Client Authorization (CLIENTAUTH) 44. The CLIENTAUTH 44 of a given User 40 will then be provided to the Server 18 to identify the User 40 and the User 40's access rights to Servers 18. System 10's authorization mechanism is generally represented in FIG. 3 as Authorization Mechanism (AUTH) 214 and is described in further detail below.

Figure 7:
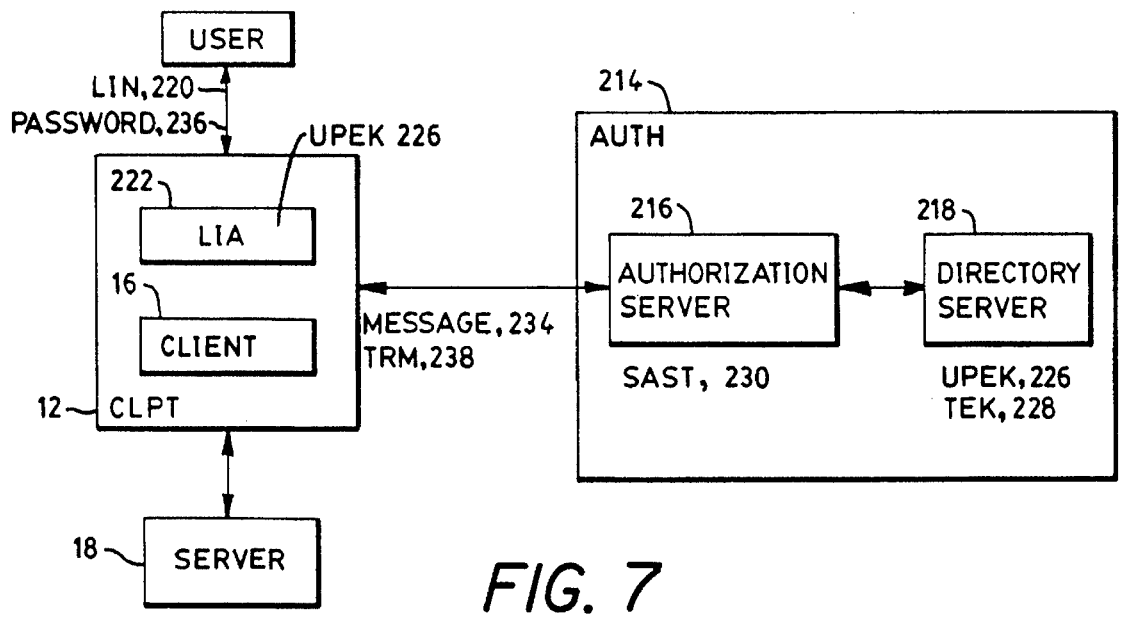
FIG. 7 is a block diagram of an authorization mechanism of the system of the present invention.

Referring to FIG. 7, therein is shown a diagrammatic representation of AUTH 214 of the present system. AUTH 214 is a modified version of the Kerberos authentication system developed by and available from the Massachusetts Institute of Technology in Cambridge, Massachusetts.

As shown in FIG. 7, AUTH 214 includes an Authorization Server 216 and a Directory Server 218. Directory Server 218 stores User 40 log-in names, User 40 passwords, User 40 access rights to the various Server 18 resources, such as databases, and a password for each Server 18.

A User 40 will log-in to System 10 by entering their Log-in Name (LIN) 220 to Log-In/Authenticator (LIA) 222 running in CLPT 12. LIA 222 sends Log-in Name 220 to Authorization Server 216. Authorization Server 216 responds by checking LIN 220 in Directory Server 220 and obtaining two encryption keys, respectively indicated in FIG. 7 as User Password Encryption Key (UPEK) 226, which is derived from the User 40 password, and Ticket Encryption Key (TEK) 228, which is derived from the Authorization Server 218 password.

Figure 8A:
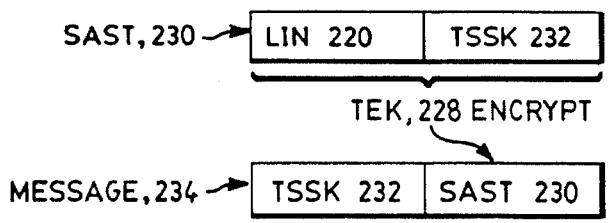
FIGS. 8A and 8B are diagrams of authorization requests and authorization tickets of the authorization mechanism.

Authorization Server 216 then generates a Sealed Authorization Server Ticket (SAST) 230 which contains authorization for the User 40 to access Authorization Server 216. As indicated in FIG. 8A, a SAST 230 will include at least LIN 222 and a Ticket Session Key (TSSK) 232 and is encrypted by Authorization Server 218 with TEK 228. Authorization Server 216 then generates a Message 234 which includes TSSK 232 and a SAST 230 and encrypts Message 234 with the UPEK 226.

Message 234 is then returned to User 40 and User 40 is prompted for the User 40 Password 236. The User Password 236 entered by User 40 is encrypted by LIA 222 to generate a User Password Encryption Key (UPEK) 226 which is used to decrypt Message 234. If the UPEK 226 which is generated from User Password 236 as provided by User 40 is the same as the UPEK 226 obtained by Authorization Server 216 from Directory Server 218, then Message 234 will by decrypted to obtain TSSK 232 and SAST 230, wherein SAST 230 is still encrypted by TEK 228. TSSK 232 and SAST 230 will be stored in CLPT 12.

Figure 8B:
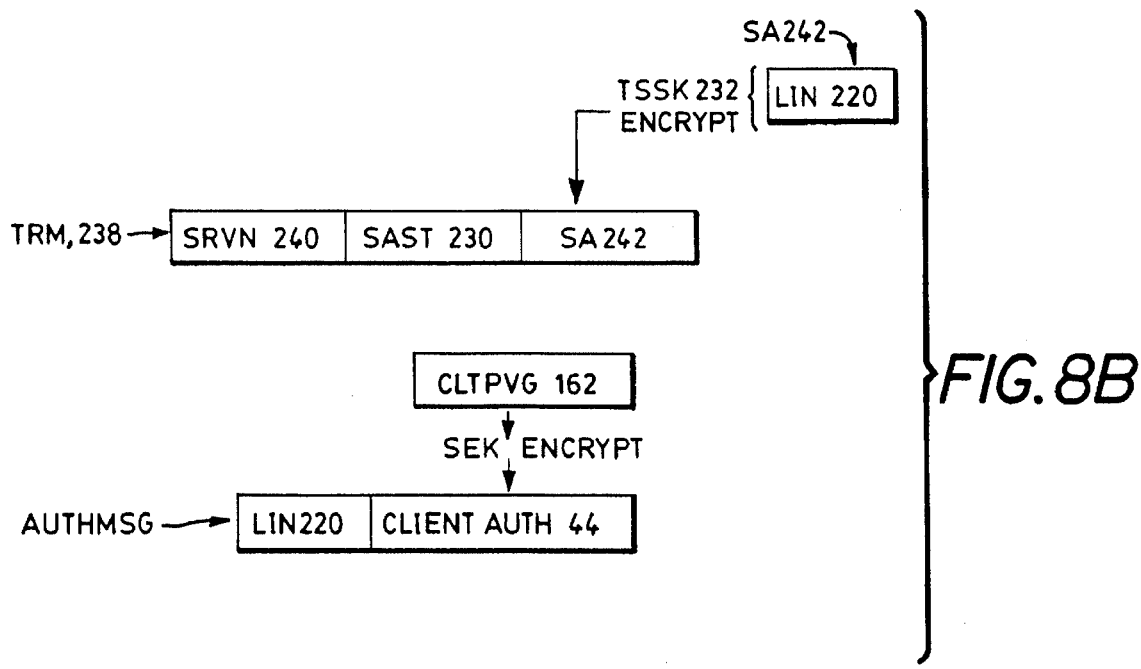

Thereafter, when User 40 wishes to request an operation with respect to a Server 18, User 40 will identify the Server 18 to LIA 220 which will generate a Ticket Request Message (TRM) 238 as represented in FIG. 8B. TRM 238 includes a Server Name (SVRN) 240 of the Server 18, SAST 230, and a Sealed Authenticator (SA) 242, which in turn includes at least LIN 220, wherein LIA 222 will encrypt SA 242 with TSSK 232.

LIA 222 then sends TRM 238 to Authorization Server 216, which will decrypt SA 242 using TSSK 232 and will decrypt SAST 230 using TEK 228. Authorization Server 216 will then check LIN 220 and, if correct, will index Directory Server 220 with SVRN 240 to obtain a Server 18 Encryption Key (SEK) 244 for that Server 18 wherein SEK 244 is the password for the Server 18. Authorization Server 216 will also index Directory Server 218 with LIN 220 to obtain the client access privileges (CLTPVG 162) to that Server 18 for that User 40.

Authorization Server 216 will encrypt CLTPVG 162 using SEK 244 as the encryption key to generate a sealed Server 18 authorization ticket, which is referred to herein as CLIENTAUTH 44. Authorization Server 216 will then construct an Authorization Message (AUTHMSG) 246 which includes LIN 220 and CLIENTAUTH 44, will encrypt AUTHMSG 246 with UPEK 226, and will return AUTHMSG 246 to LIA 222.

LIA 222 will decrypt AUTHMSG 246 using UPEK 226 to obtain CLIENTAUTH 44, which will still be encrypted with SEK 244 and CLIENTAUTH 44 will be sent to Server 18 as described above with regard to the operation of the connection mechanism and Server 18. The assigned Worker Task 136 of the Server 18, which knows it own password, that is, SEK 244, will decrypt CLIENTAUTH 44 to obtain CLTPVG 162.

Rather than placing just a log-in name or identification number in CLIENTAUTH 44, therefore, Authorization Server 216 will place more information about the user, such as the user's access rights and display name, which is information that the Server 18 would typically have to request from Directory Server 220. By having this information in the authentication data, Server 18 has no need to contact Directory Server 220, thereby saving time in checking the user access rights and eliminating the need to trust the Server 18 with access to Directory Server 220.

Note that the Client 16 cannot access or modify this additional information because the additional information is stored in CLTPVG 162 which is encrypted with the Server 18's password. The Client 16 thereby receives the encrypted CLIENTAUTH 44 from Authorization Server 216 and passes it to the Server 18, but only the Server 18 has the correct password necessary to decrypt the information. For this reason, Server 18 can trust the user information without having to go to the security database in Directory Server 220 itself.

The information included in CLIENTAUTH 44 may include access rights, display name, administrator flag, and so forth. The information needed by each type of Server 18 may be different. For example, a printer server needs to know if the user can access the printer that the user wants to print on, while a database server needs different access rights information. To keep the architecture efficient and flexible, the Client 16 tells Authorization Server 216 which information and access rights it wants retrieved from Directory Server 220 and stored in the encrypted ticket.

As an example, a user may want to print on LASER12 using the server name printserver. The client printing application will make a request to Authorization Server 216 for a CLIENTAUTH 44 which will allow it to talk to the server "printserver". In addition, the client will ask Authorization Server 216 to retrieve the access rights that the User 40 has for using printers. Authorization Server 216 will retrieve the printer access rights for the specified User 40, and will put them in the security packet, that is, in CLTPVG 162. This packet is then encrypted in the printserver's password, and the resulting CLIENTAUTH 44 sent back to the client. The client passes the CLIENTAUTH 44 on to printserver along with the file to be printed. The printerserver server will decrypt the CLIENTAUTH 44 to obtain the CLTPVG 162 and check that the printing access rights contained therein allow the user to use LASER12.

It should also be noted that the authorization mechanism described herein provides a means for providing all forms of information about a user to a server, and is not limited to only access rights.

In order to keep the authorization protocol, Authorization Server 216 and security databases in Directory Server 218 flexible, the protocol and database may define a format using generic field tags, which may be either be numeric or character strings. These tags allow a client to request information by using tag names, and for Authorization Server 216 to retrieve the information using tag names. This prevents Authorization Server 216 from having to specifically code for certain types of information for certain servers. The Server 18 can also pull information out of the CLTPVG 162 using the same tag names.

A request to Authorization Server 216 would thereby have the following format:

[username][appservername][tagA][tagB]where username is the name of the User 40 the information is being requested for, appservername is the name of the server the CLIENT-AUTH 44 is being generated for, and tagA and tagB are the tag names of the information desired; for example, tagA and tagB could be "PRINTER-RIGHTS" and "ADMIN_RIGHTS".

Authorization Server 216 would then make a generic query against the security database in Directory Server 218, retrieving the fields with the specified tag names for the specified user wherein the information in the database is tagged with the different tag names, allowing generic queries. Authorization Server 216 would then pack the fields into a security packet CLTPVG 162 and encrypt CLTPVG 162 with the appservername's password to obtain the corresponding CLIENTAUTH 44, and send CLIENTAUTH 44 back to the client.

CLIENTAUTH 44 would then have the following, all of which would be encrypted with the servers password:

[username][appservername][tagA][lenA][dataA][tagB][lenB][dataB]

where tagA is the tag name of the piece of information requested, lenA is the length of the information returned, and dataA is the actual data.

The Server 18 would receive CLIENTAUTH 44 from the client, decrypt it to obtain CLTPVG 162, and then parse CLTPVG 162 to pull out the information it needs. The actual format of the data, that is, whether it is a character string, numbers, structure, and so on, is specific to the server.

It is apparent from the above description of the authorization mechanism of System 10 that the authorization mechanism decreases the operational load on the server mechanism and is able to provide a significantly enhanced response time in authenticating clients wishing access to the resources of a server. The server need not perform a separate operation to access the authorization mechanism and system directory server to obtain the access rights and other information of a user. Instead, the access rights and any other information are provided directly to the server together with the request for a server operation.

In addition, there is no compromise of security in providing the access rights directly to the server from the client as the access rights are obtained from the authorization server and, before being sent to the client, are encrypted with the server password which is known only to the authorization mechanism and the server. Thus system security is at least equal to that provided by the authorization mechanisms of the prior art.

The authorization mechanism described herein also reduces the operational load on the directory server by eliminating directory server accesses by Servers 18. Instead, what would have been done by a separate access to the directory server by a Server 18 is performed when the User 40 accesses Authorization Server 216 and Directory Server 218 to obtain authorization to access the Server 18, so that two separate operations are replaced by one operation.

In addition, system security is enhanced in that only the authorization server needs to access the directory server to obtain information about users and it is no longer necessary to enable Servers 18 to access the directory server, or to trust Servers 18 with access to the directory server. This in turn eliminates a possible security breach wherein a false Server 18 or other server or application must be allowed to access the directory server to obtain information about any user.

Finally, it should be noted that the authorization mechanism described herein is not limited to providing only access rights information to Servers 18, but may provide any information regarding the user or client application that a Server 18 may require and which would otherwise be obtained by a separate access of Directory Server 220 by a Server 18, such as a user display name or administrative information.

In this regard, the format and protocol through which information is retrieved from Directory Server 218 by a client and retrieved from a CLTPVG 162 by the server is flexible so that any desired information may be retrieved and provided to the server using the same protocol and format. As described, this flexibility is obtained through the use of generic field tags and tag names to identify and retrieve the information, thereby avoiding the limitation of specific encoding for each specific type of information.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. In a data processing system including a least one server, a plurality of clients for generating operations calls, each operation call specifying an operation to be performed between a client and a server, and at least one connection for providing a communication path between a client and a server, a connection mechanism responsive to an operation call for providing connection between the client and the server, comprising:

a connection control block for each connection, at least one client control block, and at least one session control block, each connection control block including an identification of a corresponding connection, each client control block including an identification of a corresponding client, and an identification of a corresponding session control block, and each session control block corresponding to a client control block and establishing a session between a client identified in the corresponding client control block and a connection to a server for executing an operation between the client and the server through the connection and including an identification of the session, an identification of the connection, an identification of the server, and a connection manager responsive to the connections for providing the connection control blocks and the operation calls for providing the client control blocks and session control blocks, wherein each session between a client and a connection to a server is established solely through a corresponding session control block and wherein each operation is identified by the corresponding session identification to relate the operation to a client, a connection and a session.

2. The connection mechanism of claim 1, further comprising:

a stack mechanism associated with each connection control block for storing at least one operation stack, each operation stack corresponding to an operation to be executed through the corresponding connection and including the session identifier of the session through which the operation is being executed, and at least one operation request that is to be executed to execute the operation, and wherein each connection control block further includes an identifier of the stack of the operation currently being executed through the corresponding connection and the state of execution of the operation currently being executed through the corresponding connection.

3. The connection mechanism of claim 2, wherein each operation to be executed through a connection is executed as a sequence of remote procedure call requests and the connection mechanism further comprises:

an operation execution control responsive to each operation call for generating a corresponding sequence of remote procedure call requests, storing the corresponding sequence of remote procedure call requests in a corresponding stack as the at least one operation request to be executed to execute the operation, and for each connection, executing the sequence of remote procedure call requests of the operation currently being executed through the corresponding connection, wherein each remote procedure call request of the operation currently being executed through the corresponding connection is identified by the corresponding session identifier.

4. The connection mechanism of claim 1 further comprising a connection configuration control for specifying a configuration of connections to be established between the clients and the servers through the session wherein the connection manager is responsive to the connection configuration control for providing client control blocks, connection control blocks and session control blocks according to a connection configuration specified by the connection configuration control.

5. The connection mechanism of claim 4 wherein a first configuration of connections is a shared connection configuration comprising:

a single connection for each server, a single session for each connection, a single client control block for a plurality of clients, and plurality of session control blocks associated with the client control block, whereby the plurality of clients will share the single connection.

6. The connection mechanism of claim 4 wherein a second configuration of connections is a single connection configuration comprising:

a single connection for each server, a single session for each connection, a single client associated with each client control block, and a plurality of session control blocks associated with the client control block, whereby each connection will be associated with a single client.

7. The connection mechanism of claim 4 wherein a third configuration of connections is a connection pooling configuration comprising:

a plurality of connections for a server, a plurality of sessions for each connection, a single client control block for each client, and at least one session control block for each client control block, whereby the plurality of connections to a server are shared by the clients.

8. The connection mechanism of claim 1, wherein the server mechanism comprises:

a dispatcher, a plurality of worker tasks, and a plurality of dispatcher shared memory areas, each dispatcher shared memory area corresponding to a worker task, the dispatcher being responsive to an operation call from the connection mechanism for selecting a worker task to execute the operation call, receiving the operation call directly into the dispatcher shared memory space of the worker task, and indicating to the worker task that an operation call has been assigned to the worker task, the worker task being responsive to the indication of an operation call for receiving the operation call from the dispatcher shared memory space of the worker task, executing the operation call, placing the results of the operation call into the dispatcher shared memory space of the worker task, and indicating to the dispatcher that the operation call is completed, the dispatcher being responsive to the indication that the operation call is completed for providing the results of the operation request directly from the dispatcher shared memory space of the worker task to the connection mechanism.

9. The server mechanism of claim 8, wherein:

each operation call provided from a client is provided from the connection mechanism as a sequence or one or more remote procedure call requests, each remote procedure call request including an associated buffer containing the parameters of the remote procedure call request, and the server mechanism further includes a plurality of worker control blocks, each worker control block corresponding to a worker task and including a semaphore which is set by the dispatcher to indicate that an remote procedure call request has been assigned to the worker task, and wherein the dispatcher is responsive to a remote procedure call request for receiving the buffer directly into the dispatcher shared memory space of the worker task selected to execute the remote procedure call request, and setting the semaphore in the worker control block corresponding to the selected worker task, and providing a request acceptance response to the client mechanism, the selected worker task is responsive to the semaphore in the corresponding worker control block for reading the associated parameters from the buffer, performing the assigned remote procedure call request, and placing the results of the remote procedure call request into the dispatcher shared memory space of the worker task, and generating a remote procedure call to the dispatcher to indicate that the assigned remote procedure all request has been completed, the dispatcher being responsive to the remote procedure call from the worker task for sending the results of the remote procedure call to the connection mechanism directly from the corresponding dispatcher shared memory space.

10. In a data processing system including a least one server, a plurality of clients for generating operations calls, each operation call specifying an operation to be performed between a client and a server, and at least one connection for providing a communication path between a client and a server, a method for providing a connection between a client and the server, comprising the steps of:

constructing a connection control block for each connection, constructing at least one client control block, and constructing at least one session control block, wherein
each connection control block includes
an identification of a corresponding connection, each client control block includes
an identification of a corresponding client, and
an identification of a corresponding session control block, and each session control block corresponds to a client control block and establishes a session between a client identified in the corresponding client control block and a connection to a server for executing an operation between the client and the server through the connection and includes
an identification of the session,
an identification of the connection,
an identification of the server, and wherein each session between a client and a connection to a server is established solely through a corresponding session control block and identifying each operation by the corresponding session identification to relate the operation to a client, a connection and a session.

11. The method for providing a connection between a client and the server of claim 10, further comprising the steps of:

constructing a stack mechanism for each connection control block and storing an operation stack in the stack mechanism for each operation to be executed through the connection, wherein each operation stack corresponds to an operation to be executed through the corresponding connection and includes
the session identifier of the session through which the operation is being executed, and
at least one operation request that is to be executed to execute the operation, and storing in the corresponding each connection control block
an identifier of the stack of the operation currently being executed through the corresponding connection and
the state of execution of the operation currently being executed through the corresponding connection.

12. The method for providing a connection between a client and the server of claim 11, further comprising the steps of:

for each operation call
generating a corresponding sequence of remote procedure call requests to execute the operation call,
storing the corresponding sequence of remote procedure call requests in a corresponding stack as the at least one operation request to be executed to execute the operation, and executing the sequence of remote procedure call requests of the operation currently being executed through the corresponding connection, including
identifying each remote procedure call request of the operation currently being executed through the corresponding connection by the corresponding session identifier.

13. The method for providing a connection between a client and the server of claim 10 further comprising the step of specifying a configuration of connections to be established between the clients and the servers through the session and constructing client control blocks, connection control blocks and session control blocks according to a connection configuration specified by the connection configuration control.

14. The method for providing a connection between a client and the server of claim 13 wherein a first configuration of connections is a shared connection configuration comprising:

a single connection for each server, a single session for each connection, a single client control block for a plurality of clients, and plurality of session control blocks associated with the client control block, whereby the plurality of clients will share the single connection.

15. The method for providing a connection between a client and the server of claim 13 wherein a second configuration of connections is a single connection configuration comprising:

a single connection for each server, a single session for each connection, a single client associated with each client control block, and a plurality of session control blocks associated with the client control block, whereby each connection will be associated with a single client.

16. The method for providing a connection between a client and the server of claim 13 wherein a third configuration of connections is a connection pooling configuration comprising:

a plurality of connections for a server, a plurality of sessions for each connection, a single client control block for each client, and at least one session control block for each client control block, whereby the plurality of connections to a server are shared by the clients.

17. The method for providing a connection between a client and the server of claim 10, further comprising the method for executing an operation call in the server mechanism comprising the steps of:

providing a plurality of dispatcher shared memory areas, each dispatcher shared memory area corresponding to a worker task for executing operation calls, dispatching an operation call to a worker task by selecting a worker task to execute the operation call, receiving the operation call directly into the dispatcher shared memory space of the worker task, and indicating to the worker task that an operation call has been assigned to the worker task, receiving the operation call from the dispatcher shared memory space and into the selected worker task, executing the operation call in the selected worker task, placing the results of the execution of the operation call into the dispatcher shared memory space of the worker task, and returning the results of the operation call directly from the dispatcher shared memory space of the worker task to the connection mechanism.

18. The method to be executed in a server mechanism for executing the operation requests of claim 17, wherein:

each operation call provided from a client is provided from the connection mechanism as a sequence or one or more remote procedure call requests, each remote procedure call request including an associated buffer containing the parameters of the remote procedure call request, and further including the steps of providing a plurality of worker control blocks, each worker control block corresponding to a worker task and including a semaphore, wherein the steps of dispatching a remote procedure call request to a worker task further include the steps of receiving the buffer directly into the dispatcher shared memory space of the worker task selected to execute the remote procedure call request, and setting the semaphore in the worker control block corresponding to the selected worker task, and reading the associated parameters from the buffer and into the worker task, and the step of returning the results of the remote procedure call request to the connection mechanism further includes placing the results of the remote procedure call request into a result buffer in the dispatcher shared memory space, generating a remote procedure call to indicate that the assigned remote procedure call request has been completed, and sending the result buffer directly from the dispatcher shared memory space to the connection mechanism.

\* \* \* \* \*